US 8,442,861 B2

(12) United States Patent  (10) Patent No.: US 8,442,861 B2
Dance et al.  (45) Date of Patent: May 14, 2013

(54) MULTI-DIMENSIONAL PRICE DETERMINATION

(75) Inventors: Christopher R. Dance, Grenoble (FR); Onno Zoeter, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 395 days.

(21) Appl. No.: 12/792,267

(22) Filed: Jun. 2, 2010

(65) Prior Publication Data

US 2011/0302013 A1   Dec. 8, 2011

(51) Int. Cl.
*G06Q 30/00*   (2012.01)

(52) U.S. Cl.
USPC ............... 705/14.19; 705/14.13; 705/14.1; 705/7.35

(58) Field of Classification Search .............. 705/7.35, 705/14.13, 14.1
See application file for complete search history.

(56) References Cited

U.S. PATENT DOCUMENTS

| | | | |
|---|---|---|---|
| 7,050,868 B1* | 5/2006 | Graepel et al. ................. | 700/93 |
| 7,089,204 B1* | 8/2006 | Nieboer et al. ................ | 705/37 |
| 7,454,367 B2* | 11/2008 | Yu et al. ....................... | 705/26.8 |
| 7,523,047 B1* | 4/2009 | Neal et al. .................... | 705/7.35 |
| 2002/0107074 A1* | 8/2002 | Lee .............................. | 463/42 |
| 2002/0143619 A1* | 10/2002 | Laurie ........................... | 705/14 |
| 2005/0043994 A1* | 2/2005 | Walker et al. ................. | 705/14 |
| 2006/0106710 A1* | 5/2006 | Meek et al. .................... | 705/37 |
| 2008/0221948 A1* | 9/2008 | Eglen et al. ................... | 705/7 |
| 2008/0313069 A1* | 12/2008 | Jain .............................. | 705/37 |
| 2009/0076939 A1* | 3/2009 | Berg et al. ..................... | 705/37 |

OTHER PUBLICATIONS

Kotsiantis et al., "Discretization Techniques: A recent survey", GESTS International Transactions on Computer Science and Engineering, vol. 32 (1), 2006, pp. 47-58.*
Benchekroun et al., "Could myopic pricing be a strategic choice in marketing channels? A game theoretic analysis", Journal of Economic Dynamics and Control, vol. 33, published online as of Apr. 5, 2009.*
Conti, "Concepts for Buffer Storage", IEEE Computer Group News, Mar. 1969.*
U.S. Appl. No. 12/695,757, filed Jan. 28, 2010, Dance, et al.
U.S. Appl. No. 12/792,028, filed Jun. 2, 2010, Dance, et al.
U.S. Appl. No. 12/792,254, filed Jun. 2, 2010, Dance, et al.
U.S. Appl. No. 12/792,124, filed Jun. 2, 2010, Dance, et al.
Manelli, et al. "Pricing mechanism design: Revenue maximization and the multiple-good monopoly," *J. Economic Theory*, 137:153-185 (2007).

(Continued)

*Primary Examiner* — John Weiss
*Assistant Examiner* — Scott C Anderson
(74) *Attorney, Agent, or Firm* — Fay Sharpe LLP

(57) ABSTRACT

A system and method are provided. The method includes establishing a current belief about the multidimensional distribution of buyers' valuations for at least one item, and, based on the current belief, proposing at least one pricing mechanism, each pricing mechanism establishing a price for the at least one item. Observed buyers' responses to at least one of the set of proposed pricing mechanisms are stored. Region censored updates to the belief about the multidimensional distribution of buyers' valuations are conducted, based on the observed responses, to generate a new belief about the multidimensional distribution of buyers' valuations. Based on the new belief, a pricing mechanism establishing a price for the at least one item is proposed, that is expected to improve a seller's welfare under the new belief, relative to the originally proposed mechanism or mechanisms.

18 Claims, 8 Drawing Sheets

OTHER PUBLICATIONS

Briest, et al. "Pricing Randomized Allocations," Proc. 21st Annual ACM-SIAM Symp. on Discrete Algorithms (*Ed., Moses Charikar*, Jan. 2010).

Aguilera, et al. "On convex functions and the finite element method," SIAM Journal on Numerical Analysis 47(4):3139-3157, (2009).

Farias, et al. "Revenue Management Beyond 'Estimate then Optimize,'" PhD. Dissertation, Stanford University (2007).

Avis, D. "IRS: A Revised Implementation of the Reverse Search Vertex Enumeration Algorithm," In: Polytopes—Combinatorics and Computation, G. Kalai & G. Ziegler eds., Birkhauser-Verlag, DMV Seminar Band 29, pp. 177-198 (2000).

Lai, et al. "Adaptive treatment allocation and the multi-armed bandit problem," The Annals of Statistics, 1987.

R. Agrawal, "Sample mean based index policies with O (log n) regret for the multi-armed bandit problem," Advances in Applied Probability, 1995.

Auer, et al. "Finite-time analysis of the multiarmed bandit problem," Machine Learning,(2002).

Chaloner, et al. "Bayesian Experimental Design: A Review," *Statistical Science*, (3):273-304 (1995).

Genz, et a. "Comparison of methods for the computation of multivariate-t probabilities," Journal of Computational and Graphical Statistics, 1993.

Bulla, et al. "Bayesian Nonparametric Estimation of a Bivariate Survival Function," Statistica Sinica, 17, 427-444 (2007).

Minka, T., Expectation Propagation for Approximate Bayesian Inference. *Proc. 17th Annual Conf. Uncertainty in Artificial Intelligence* (2001); and Minka, T., A family of algorithms for approximate Bayesian inference. PhD Thesis, MIT (2001).

Avis, D. "Reverse Search for Enumeration," Nov. 3, 1993.

Aloysius, et al. Leveraging Revealed Preference Information by Sequentially Pricing Multiple Products (2009), http://comp,uark.edu/~cdeck/Leveraging%20Revealed%20Preference%20Information%20by%20Sequenti ally%20Pricing%20Multiple%20Products.pdf.

Laibson, et al. "Golden eggs and hyperbolic discounting," Quarterly Journal of Economics, 112(2):443-77 (1997).

Xie, et al. "Advance Selling Theory, in Handbook of Pricing Research in Marketing," (Vithale R. Rao, Ed. (2007).

oDesk® (see www.odesk.com) accessed May 17, 2010.

Elance™ (see www.elance.com accessed May 17, 2010.

Thanassoulis, J. "Haggling over Substitutes," Sep. 2003.

Pavan, et al. "Dynamic Design: Incentive Compatibility, Profit Maximization and Information Disclosure," May 8, 2009.

Carvalho, et al. "Dynamic Optimization and Learning: How Should a Manager Set Prices when the Demand Function is Unknown?" Sep. 2005.

Araman, et al. "Dynamic Pricing for Non-Perishable Products with Demand Learning," *DIMACS Workshop on Yield Management and Dynamic Pricing*, Aug. 2005.

Avis, et al. "A Pivoting Algorithm for Convex Hulls and Vertex Enumeration of Arrangements and Polyhedra," Nov. 1990.

Lobo, et al. "Pricing and learning with uncertain demand," Nov. 2003.

Kleinberg,et al. "The Value of Knowing a Demand Curve: Bounds on Regret for On-line Posted Price Auctions," Jul. 21, 2004.

Simon, C. "Dynamic Pricing with Demand Learning under Competition," 2004, http://mit.dspace.org/bitstream/handle/1721.1/42064/231846029.pdf?sequence=1 (Note: Reference is encrypted and cannot be printed).

Capet, et al. "A Risk Assessment System with Automatic Extraction of Event Types," *IFIP International Federation for Information Processing*, vol. 288, pp. 220-229, 2008.

"Pay-what-you-like restaurants", http://www.cnn.com/2008/TRAVEL/04/01/flex.payment/index.html (last accessed May 7, 2010).

Asmuth et al., "A Bayesian Sampling Approach to Exploration in Reinforcement Learning", 25th UAI, pp. 19-26, 2009.

K. Roberts, "The characterization of implementable choice rules", in Jean-Jacques Laffont, editor, Aggregation and Revelation of Preferences. Papers presented at the 1st European Summer Workshop of the Econometric Society, pp. 321-349. North-Holland, 1979 (Description only).

Minka, "A family of algorithms for approximate Bayesian inference", PhD Thesis, MIT (2001).

T. Heskes, and O. Zoeter, "Expectation Propagation for Approximate Inference in Dynamic Bayesian Networks", Proc. 18th Annual Conf. Uncertainty in Artificial Intelligence (2002).

Infanger, "Large-Scale Systems and Benders Decomposition", Lecture Notes, MS&E348, Stanford University (2009).

http://en.wikipedia.org/wiki/Dirichlet_distribution accessed Jun. 30, 2010.

* cited by examiner

MULTI-DIMENSIONAL PRICE DETERMINATION

CROSS REFERENCE TO RELATED PATENTS AND APPLICATIONS

Cross reference is made to the following co-pending applications, all filed on Jun. 1, 2010, the disclosures of which are incorporated herein by reference in their entireties:

Application Ser. No. 12/792,028, entitled LEARNING OPTIMAL PRICES, by Christopher R. Dance and Onno Zoeter;

Application Ser. No. 12/792,254, entitled LIMITED LOTTERY INSURANCE by Christopher R. Dance, Onno Zoeter, and Guillaume Bouchard; and Application Ser. No. 12/792,124, entitled MACHINE LEARNING FOR OPTIMIZATION AND SERVICES, by Christopher R. Dance and Onno Zoeter.

BACKGROUND

The exemplary embodiment relates to a method and system of selling goods and services. It finds particular application in connection with methods for learning multidimensional pricing mechanisms.

A buyer considering a purchase is likely to buy an item if the value that he places on the item is greater than the price he will have to pay for the item. However, buyers rarely value only one alternative when considering a purchase. There may be near-substitute products (e.g., multiple TVs), alternative payment methods (e.g., corresponding to different buyer time discounting or interest rates), varying quantities and qualities of the same product, or different expectations about mean future values (e.g., when advance-selling the same item, which can result in arbitrarily more profit than selling one item at a time). All of these factors can affect whether or not a buyer will purchase a given item. From the seller's perspective, each potential buyer has his own value placed on an item, which the seller would like to know in order to establish prices. He may attempt to estimate the buyer's value from prior sales on the assumption that if a prior buyer has paid the price, the buyer's value must have been higher. Sellers generally want to maximize their profit, which is a function of the sales price and the number of goods sold. The seller may adjust the price over time to obtain a better idea of what buyers are willing to pay, but this process can be time consuming and expensive for the seller. Frequent manipulation of pricing can also be problematic, since it can annoy buyer If the price is set too high then buyers may go elsewhere, and may not return to the seller even if the seller later lowers the price.

For purposes of the embodiments described herein, a buyer is described by a point in value space at a particular time, where each axis corresponds to the valuation for one alternative item. For example, where two different items are being sold, each item has its own value axis and the value space is dimensional. A seller's belief about buyers can be considered as a probability density over the value space. The seller's objective is to divide the value space into regions that are served by different contracts. These regions are known as (market) segments.

Optimal pricing mechanisms have been characterized in detail via a function that describes a buyer's utility when they purchase the best possible contract for themselves. This function is known as the mechanism function (see, Mane A., Vincent D. Pricing mechanism design: Revenue maximization and the multiple-good monopoly. *J. Economic Theory*, 137:153-185 (2007)). Briest, et al. investigated the profit from an optimal lottery relative to the profit from an optimal non-lottery pricing scheme. They showed that the gain is three in two dimensions, and unbounded in four and higher dimensions (Briest, P., Chawla, S., Kleinberg, R., Weinberg, S., Pricing Randomized Allocations. Proc. 21st Annual ACM-SIAM Symp. on Discrete Algorithms (Ed., Moses Charikar, January 2010)). Surprisingly, optimal lotteries may be found efficiently using linear programming or semi-definite programming. Effective methods for solving such problems are discussed by Aguilera and Morin (Aguilera, N., Morin, P., On convex functions and the finite element method. SIAM Journal on Numerical Analysis 47(4):3139-3157, (2009)).

Existing work on pricing tends to focus on setting a price where there is limited supply, e.g., a single item. There remains a need for a method for learning pricing mechanisms for setting prices.

INCORPORATION BY REFERENCE

The following reference, the disclosure of which is incorporated herein by reference in its entirety, is mentioned:

U.S. application Ser. No. 12/695,757, filed Jan. 28, 2010, entitled TRUTH SIGNALS, by Christopher R. Dance, Onno Zoeter, Yu An Sun, and Venkatesh Guru Rao, a method and apparatus for paying for an existing report. The method includes receiving an existing report for which a first structure of entities is identified. Thereafter, a set of other reports are received for which respective second structures of entities are identified. A weighting is selected for other reports in the set of other reports based on the respective structures. A payment for the existing report is extracted, based on the weighting, a selected scoring rule, and the set of other reports. One or more of the weighting selection and payment extraction may be performed by a computer processor.

BRIEF DESCRIPTION

In accordance with one aspect of the exemplary embodiment, a method for learning a pricing mechanism is provided. The method includes establishing a current belief about the multidimensional distribution of buyers' valuations for at least one item and, based on the current belief, proposing at least one pricing mechanism, each pricing mechanism establishing a price for the at least one item. Observed buyers' responses to at least one of the set of proposed pricing mechanisms are stored. Region censored updates to the belief about the multidimensional distribution of buyers' valuations are conducted, based on the observed responses to generate a new belief about the multidimensional distribution of buyers' valuations and, based on the new belief, a pricing mechanism establishing a price for the at least one item is proposed.

In another aspect, a system includes non-transitory memory which stores instructions for establishing a current belief about the multidimensional distribution of buyers' valuations for at least one item, based on the belief, proposing at least one pricing mechanism, each pricing mechanism establishing a price for the at least one item, storing observed buyers' responses to at least one of the set of proposed pricing mechanisms, conducting region censored updates to the belief about the multidimensional distribution of buyers' valuations based on the observed responses to generate a new belief about the multidimensional distribution of buyers' valuations, and, based on the new belief, proposing a pricing mechanism establishing a price for the at least one item. A processor in communication with the memory is provided for executing the instructions.

In another aspect, a method for establishing a pricing mechanism includes a) establishing a current belief about the multidimensional distribution of buyers' valuations for a plurality of items; b) based on the current belief, proposing a first pricing mechanism which tests the current belief, the pricing mechanism establishing a price and for each of the items, a non-deterministic probability of receiving the item for the price; c) offering the pricing mechanism to a plurality of buyers; d) storing the buyers' responses to the offered pricing mechanism; e) updating the current belief about the multidimensional distribution of buyers' valuations based on the responses to generate a new belief about the multidimensional distribution of buyers' valuations; f) based on the new belief, proposing a second pricing mechanism establishing a price for the plurality of items; and g) repeating a)-f) at least once, wherein in each repeat, in a), the current belief is the new belief most recently established in f).

DETAILED DESCRIPTION

Figure 1:
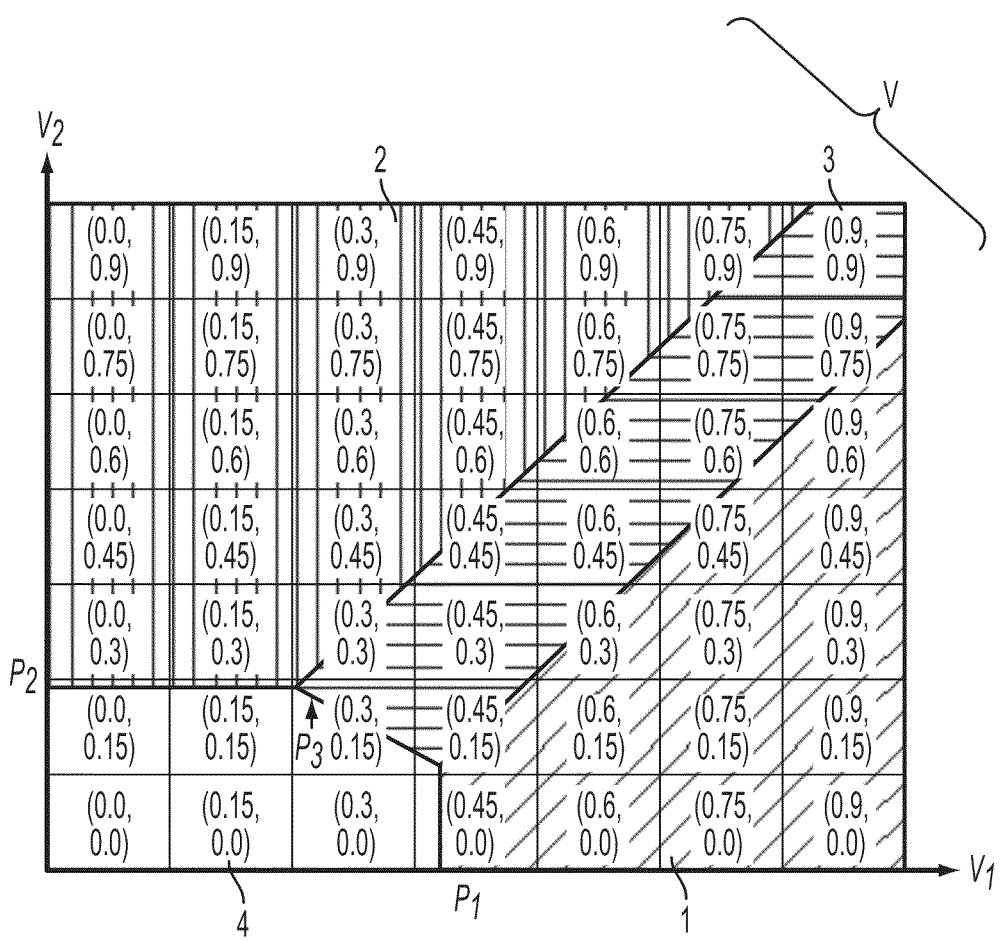
FIG. 1 is a graph showing a two-dimensional space of buyer valuations.

Aspects of the exemplary embodiment relate to a system and method for designing a pricing mechanism for price experimentation.

Briefly, the exemplary method includes 1) proposing a set of pricing mechanisms for pricing items (the set may be provided at different places, different times, and/or in different languages), 2) observing buyers' responses to the proposed mechanisms, 3) conducting region-censored updates to a belief about the multidimensional distribution of buyers' valuations, and 4) proposing a pricing mechanism that is expected to improve welfare under the new belief, relative to the originally proposed mechanisms.

In various aspects, the method may include one or more of:
a) caching the solution to multiple mechanism design problems in order to make the method operate faster; and
b) conducting multidimensional region-censored updates to a belief in the context of price experimentation. This means that each observation corresponds to the buyer's value coming from some multidimensional set in real Euclidean n-space for $n>1$. This needs to be multidimensional, otherwise there are connected sets that are not multidimensional such as line segments in Euclidean $n>2$-space.

A "multidimensional pricing mechanism" or simply a "pricing mechanism" or "mechanism", is a set of at least one multidimensional transaction proposals from a seller to a buyer which guarantees the buyer a non-zero probability (e.g., a non-deterministic probability) of being awarded at least one of two or more items in return for a price (or, in the case of a single item, under two or more different pricing schemes). Each pricing mechanism relies on a posterior probability distribution function (pdf) which represents a seller's belief for a buyer's multidimensional values of the item(s) offered in the mechanism, conditioned on observations through learning. More generally, a pricing mechanism is multidimensional in the sense that there is no way to arrange the entire set of buyer values in a sequence such that every possible observation of buyer values corresponds to an observation that the buyer's value comes from an interval in this sequence. This is to be distinguished from multi-item price experimentation (see, for example, Farias, V., Revenue Management Beyond "Estimate then Optimize", PhD. Dissertation, Stanford University (2007)), where the problem is reduced to a one-dimensional problem by letting the seller pick a fraction of buyers who are expected to buy each item given that they make a purchase. In the examples described, the pricing mechanism is described in terms of a lottery menu in which a number of items is/are offered to the buyer, each with an associated probability of receiving an item for a determinable price.

The terms seller and buyer are used broadly to identify the entity offering (seller) and the entity being offered and potentially accepting (buyer) the pricing mechanism.

In a commercial transaction, such as a sale or contract for services, a "buyer's surplus" from the transaction can be considered to be the difference between the buyer's valuation of the item(s) which is/are the subject of the transaction and the sale price.

A "seller's profit" from the transaction is considered as the sale price minus the cost to the seller, which may include the cost in obtaining and marketing the item. A "seller's welfare" may be equivalent to the seller's profit or may also be based on the buyer's value of the item(s).

An "item," as used herein, can refer to goods, services, contracts, offers for procurements by the seller (i.e., negative transfers, where the seller pays the price), and combinations thereof, which are typically to be transferred between a seller and a buyer.

In censored price experiment (CPE) approaches, the seller estimates the distribution of buyers' valuations from censored observations (that is, observations that the valuation is greater than the price or that the valuation is less than the price; more generally a censored observation is one that is only known to come from some set).

The exemplary pricing mechanisms can achieve higher profits in two or more dimensions, arbitrarily-higher profit in dimension four or higher, and a number of practices such as advance selling achieve arbitrarily-higher profit for a single item by treating it as multidimensional. To apply such mechanisms, an appropriate belief about the distribution of valuations is obtained. This involves learning through price experimentation.

While a multidimensional pricing mechanism can involve any number n of different items, by way of example, FIG. 1 illustrates an optimal mechanism for selling two different items (n=2), given a known distribution of buyer valuations. The mechanism assumes that each item has a cost to the seller, which is known to the seller and not the buyer, and a value for each buyer (which is normally known to the buyers but not the seller). A value space V of the buyer is delimited by the axes $v_1$ and $v_2$. A first axis $v_1$ represents the buyer's value for item 1 and a second axis $v_2$ is the buyer's value for item 2. As will be appreciated, different buyers place different values on each of the two items. In the case where buyer values are known, the value space V can be segmented into a plurality of buyer regions 1-4. Buyers who have values of $v_1$ and $v_2$ in Region 1 are willing to buy item 1 for price $p_1$ because their value on item 1 is at least $p_1$. Buyers in the Region 2 are willing to buy item 2 for price $p_2$ because the value they place on item 2 is at least $p_2$. Buyers in Region 3 are willing to enter a lottery which gives either item 1 or item 2, with some fixed probability, for a price $p_3$. Region 4 corresponds to buyers who are not willing to pay any one of $p_1$, $p_2$, and $p_3$. The seller would like to obtain such information in order to set prices $p_1$ and $p_2$, and/or $p_3$.

In the case where buyer values are not known, the buyers can be considered as a probability distribution, with the beliefs about buyer valuations being discretized over a grid, such as a 7×7 grid, as shown in FIG. 1. More formally, the distribution of the belief about buyer's valuations under a given pricing mechanism can be parameterized as vectors (e.g., the values in a parameter vector may correspond to mean and covariance) by assuming a given type of distribution Conventional methods of determining such pricing mechanisms can be relatively slow. The exemplary embodiment allows a pricing mechanism to be learned in an efficient manner.

In some embodiments, the multidimensional pricing mechanism comprises a lottery.

Figure 2:
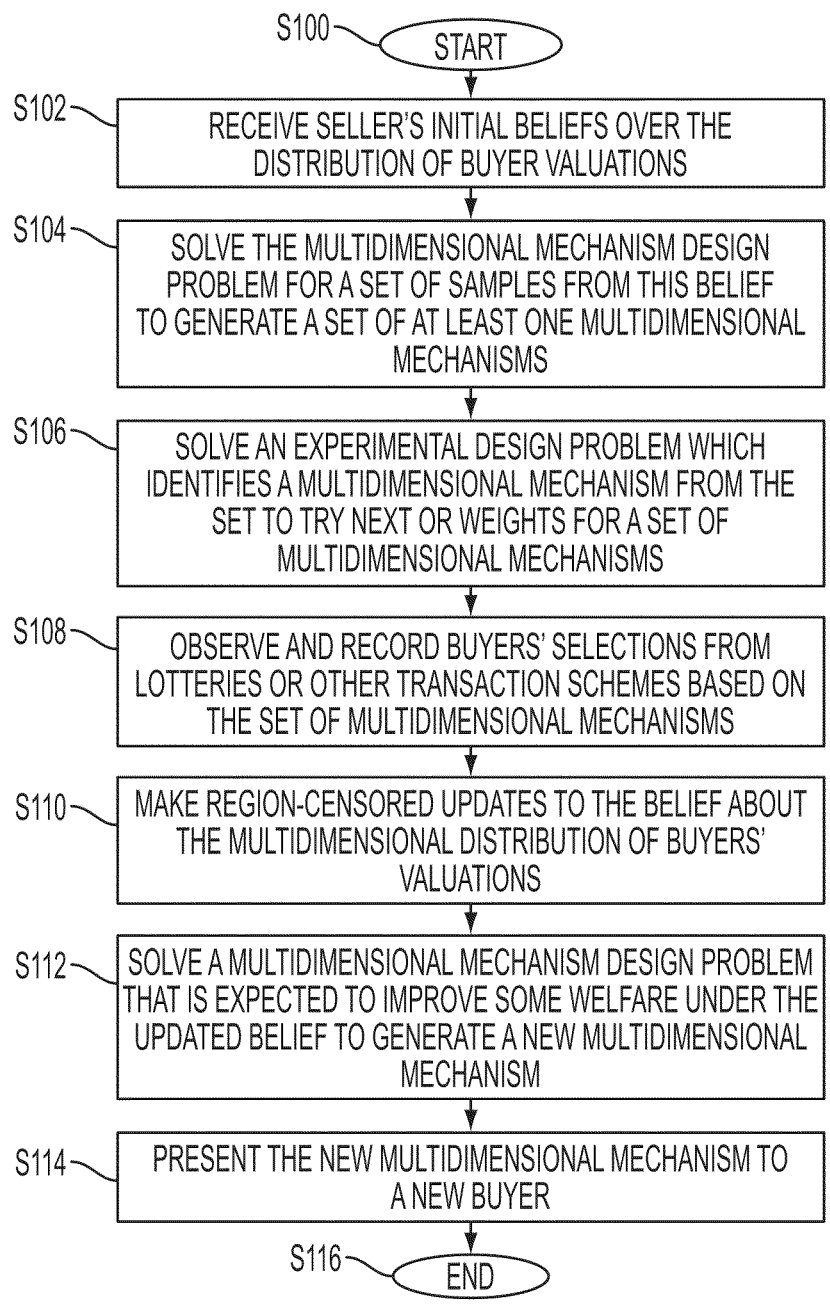
FIG. 2 is a functional block diagram of a method for designing a pricing mechanism for establishing prices.

FIG. 2 is a flowchart which illustrates one embodiment of the exemplary method. It is similar to the process in described in copending application Ser. No. 12/792,028, entitled PRICING OPTIMIZATION, except that the method aims to solve for pricing mechanisms rather than prices, and uses a region-censored belief update. The method begins at S100. Each of the steps may be computer implemented, e.g., executed by a computer processor. Or, in some embodiments, one or more of the steps may be performed manually.

At S102, the seller initializes initial beliefs over the distribution of buyer valuations for the n items.

At S104, optionally, a pricing mechanism design problem for a set of samples from this initial belief is solved for/by the seller. Since initial belief of the buyer value space is a probability distribution, in the exemplary embodiment, the sampling may be performed by sampling from a Dirichlet of the belief, as described in greater detail below. This reduces the computation later on, however, this step may be omitted in some embodiments.

This step may be performed with one of the two methods described below (see direct approach and indirect approach). These solutions are then cached. This step may be repeated several times in the process if the belief changes. Alternatively, caching may be replaced by a direct solution each time a belief is sampled, although in large problems this could cause a computational bottleneck in the sales process. Another alternative is to find all vertices of a convex polytope defined by a given set of inequalities, thereby finding all possible solutions to a linear program. For example, the package "Irs" (See, Avis, D. "Irs: A Revised Implementation of the Reverse Search Vertex Enumeration Algorithm," In: Polytopes—Combinatorics and Computation, G. Kalai & G. Ziegler eds., Birkhauser-Verlag, DMV Seminar Band 29, pp. 177-198 (2000). Such a package works well for a 2×2 grid (giving a polytope in 12-dimensions) but may be computationally expensive for larger grids, for example, computation for a 3×3 grid (a polytope in 27-dimensions). In such cases, a special-purpose vertex enumeration can be designed, enabling faster mechanism design even in 4-dimensional problems.

At S106, an experimental design problem is solved for/by the seller using one or more of the methods outlined below. This step identifies suitable mechanisms from those proposed at S104 to pose to the buyers.

At S108, buyers' selections from lotteries conducted in accordance with the selected pricing mechanism(s) are observed and recorded.

At S110, region-censored updates to the belief about the multidimensional distribution of buyers' valuations may be made by/for the seller. An update is "region-censored" if the random variable observed is considered as only known to come from some region of a multidimensional space (here, the space of buyer valuations).

An illustrative region-censored update scheme is given below.

At S112, a new pricing mechanism design problem that is expected to improve some welfare under the updated belief is solved by/for the seller, as for S104.

At S114, the corresponding mechanism is presented to a new buyer.

The method ends at S116.

Figure 3:
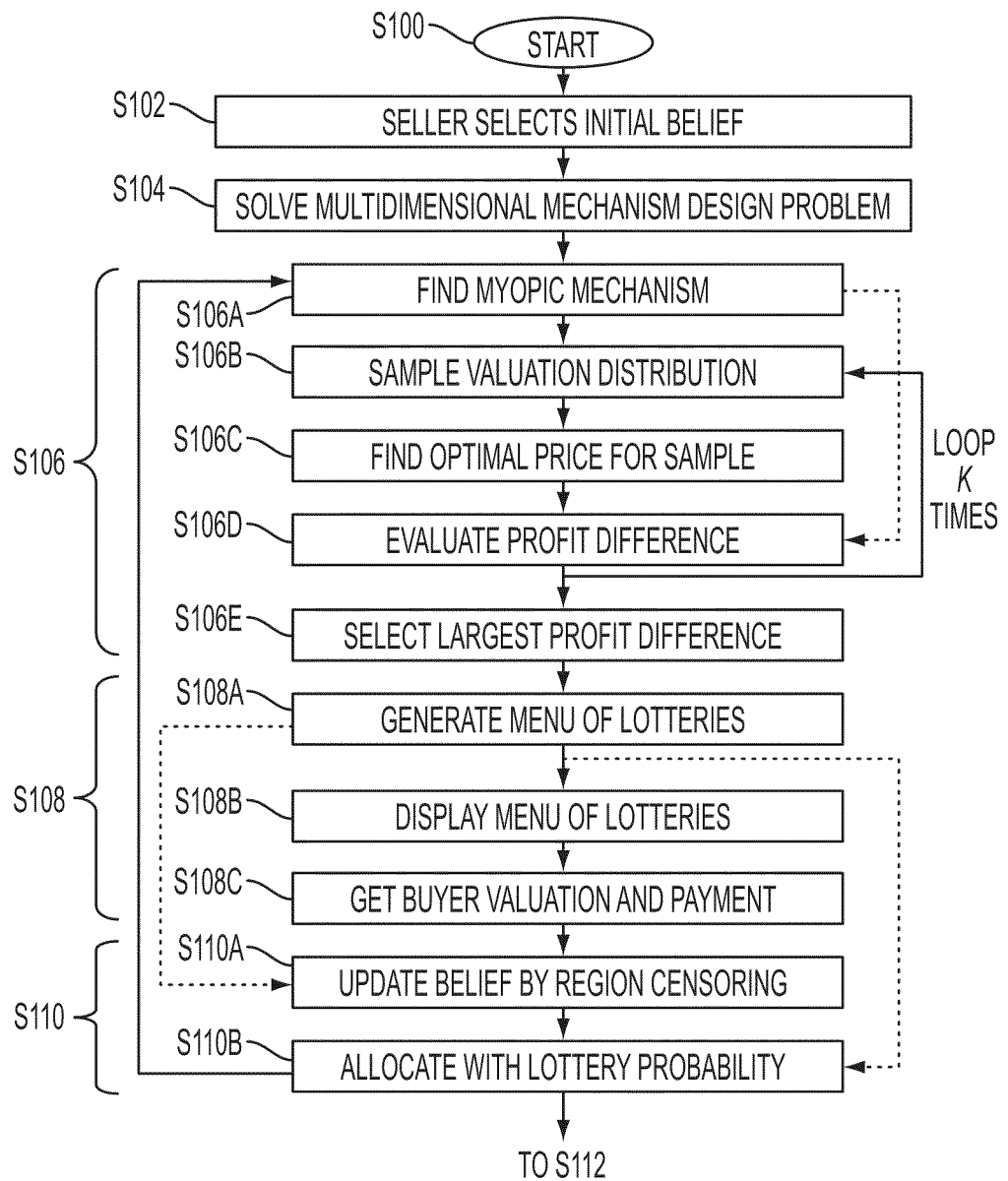
FIG. 3 is a functional block diagram of a system for designing a pricing mechanism for establishing prices.

FIG. 3 illustrates one specific embodiment of the method, by way of example, which is described in further detail below.

Figure 4:
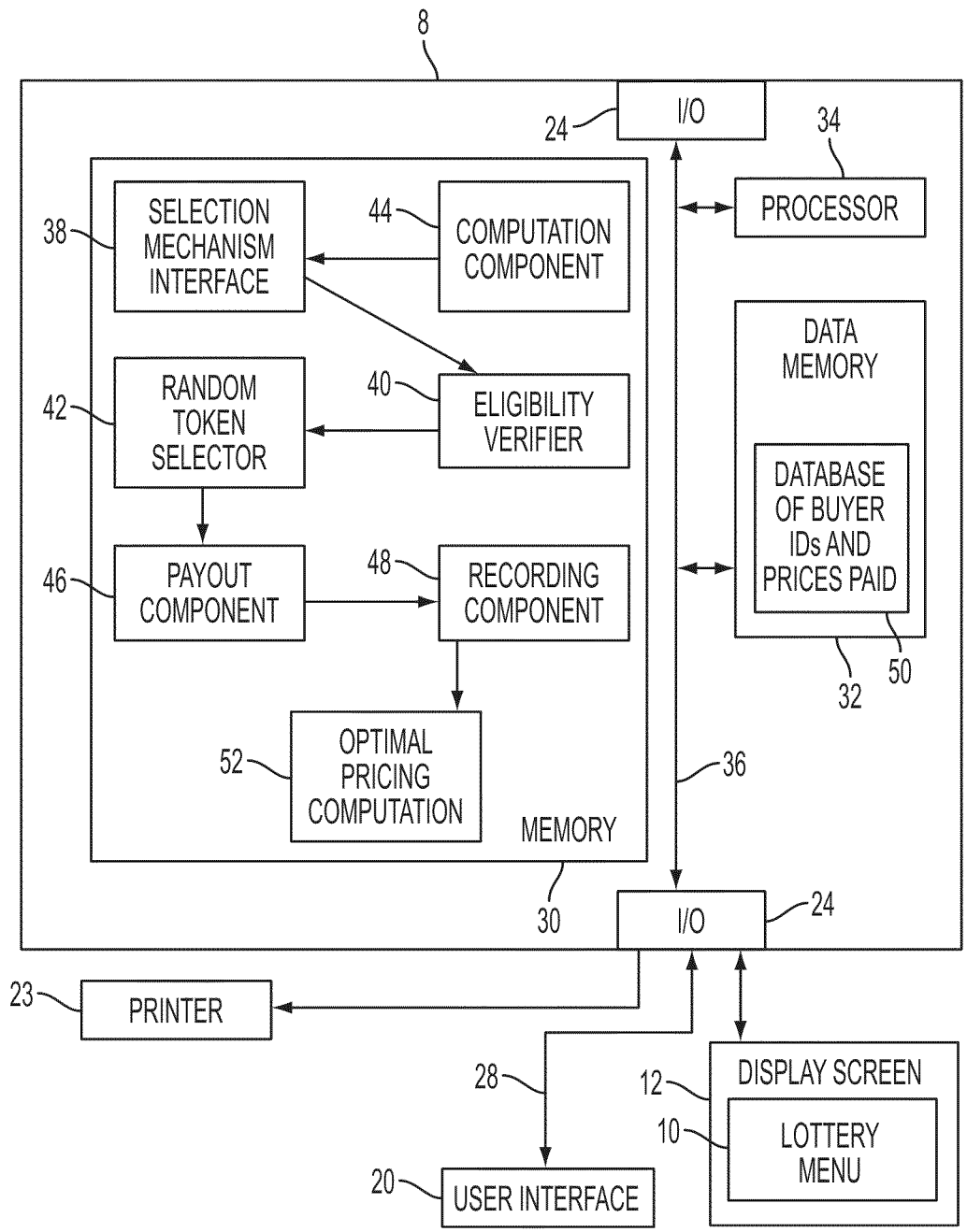
FIG. 4 illustrates an example pricing mechanism in the form of a lottery menu.
Figure 5:
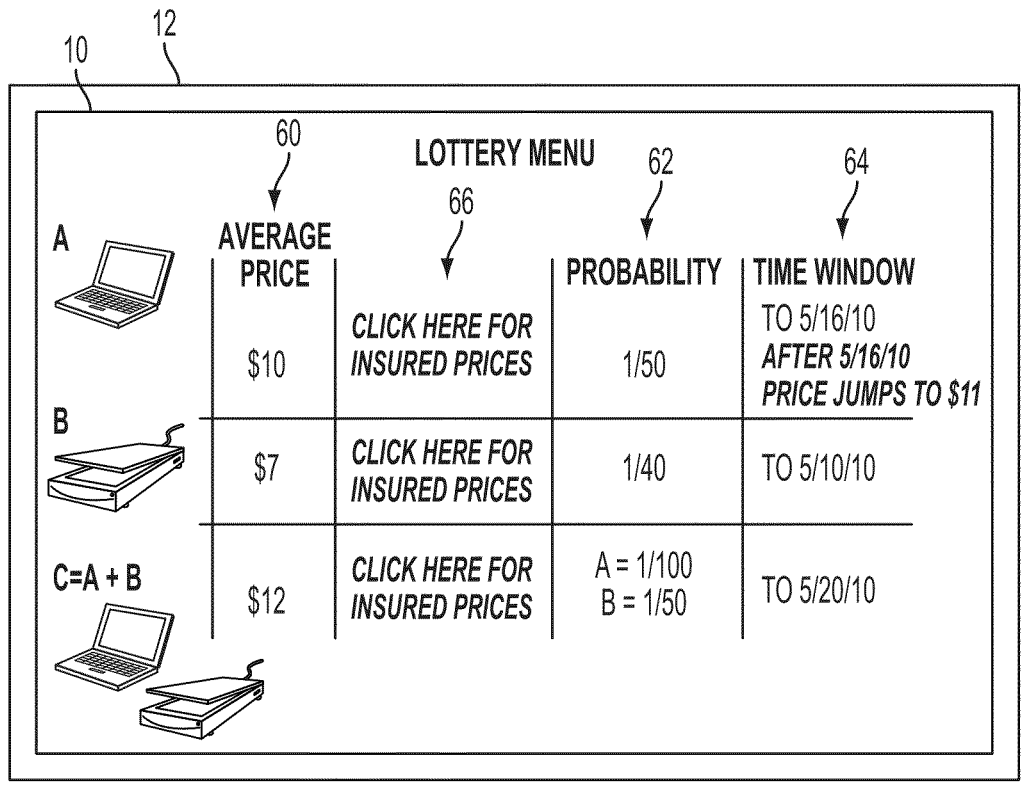
FIG. 5 illustrates aspects of the method of FIG. 2.
Figure 5:
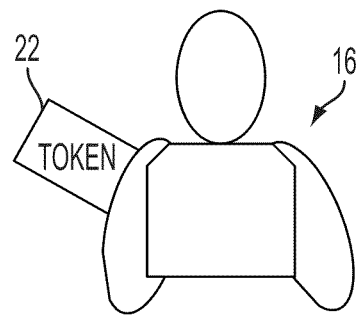

FIG. 4 illustrates an exemplary system 8 suited for performing the illustrated method. FIG. 5 illustrates an example lottery menu 10 which is presented by the system. The lottery menu 10 shows the options for the lottery. The lottery menu may be a tangible object, such as a sheet on which the menu options are printed, or may be displayed to a buyer 16, for example, on a display screen 12 associated with a computing device 14.

A selection mechanism is provided to the buyer. In one embodiment, the selection mechanism is provided via a graphical user interface (GUI) which includes user interface 20 and/or display screen 12, through which the user selects from the lottery menu, and prices 18. The buyer may also use the GUI to enter his ID, provides a method of payment, e.g., credit card details. A lottery token 22 may also be viewed via the GUI and printed as a record (FIG. 4) on an associated printer 23. The user interface 20 may include a keypad, keyboard, touch screen, cursor control device, or combination thereof. By "token" it is meant any indication that a contract has been formed between the buyer and seller. In other embodiments, the buyer may purchase a tangible token, such as a lottery ticket, on which his lottery option selection and insured price may both be printed.

The GUI is in communication with an input/output connection 24 of a computing device or devices 26 via a wired or wireless link 28, such as a cable, telephone connection, local area network, or wide area network, such as the Internet.

The exemplary computer includes main memory 30 which stores instructions for performing the exemplary method, data memory 32, and a processor 34 for executing the instructions, all connected via a data/control bus 36.

The exemplary computer 14 may be include one or more of a general purpose computer and a dedicated computing device, such as the buyer's laptop or desktop computer, portable digital assistant (PDA), server computer, cellular telephone, cash register or lottery ticket dispenser with computing capability, or other computing device capable of executing instructions for performing the exemplary method. In some embodiments, the computers 14 may include a client computer and a server computer, which each host some of the software for performing the exemplary method.

In the exemplary embodiment, the system includes various software components for performing the exemplary method, including a selection mechanism interface 38, which receives the buyer's selections and stores them in data memory 32, an eligibility verifier 40, which determines whether the buyer is eligible to participate in the selected lottery option, a random token selector 42, which identifies one or more of the buyers as recipients of the items offered, a computation component 44, a payout component 46, which makes payments to the seller/buyers, depending on the outcomes and prices, a recording component 48 which records the buyer's ID and prices paid for items in a database 50, and optionally an optimal pricing computation component 52, which provides optimal pricing information to the seller, based on a set of lotteries conducted by the buyer, as described in further detail below. The computation component 44 may include subcomponents for proposing pricing mechanisms, sampling the buyer value space for each of a set of multidimensional design mechanisms (S104) solving an experimental design problem (S106), providing region-censored updates for the seller's belief about buyers' valuations (S110) and solving a pricing mechanism design problem that is expected to improve some welfare under the updated belief (S112).

In the exemplary embodiment, the database 50 is stored in memory 32. Alternatively, it may be resident on a remote server computer (not shown).

The memory 30, 32 may be separate or combined and may represent any type of tangible computer readable medium such as random access memory (RAM), read only memory (ROM), magnetic disk or tape, optical disk, flash memory, or holographic memory. In one embodiment, the memory 30, 32 comprises a combination of random access memory and read only memory. In some embodiments, the processor 34 and memory 30 may be combined in a single chip. The interface 24 allows the computer to communicate with other devices via a computer network, such as a local area network (LAN) or wide area network (WAN), or the internet, and may comprise a modulator/demodulator (MODEM).

The digital processor 34 can be variously embodied, such as by a single-core processor, a dual-core processor (or more generally by a multiple-core processor), a digital processor and cooperating math coprocessor, a digital controller, or the like. The exemplary digital processor 34, in addition to controlling the operation of the computer 26, executes instructions stored in memory 30 for performing the method outlined in FIG. 2.

As will be appreciated, FIG. 3 is a high level functional block diagram of only a portion of the components which are incorporated into a computer system 26. Since the configuration and operation of programmable computers are well known, they will not be described further.

In FIG. 4, three lottery options are shown, for A, B, and C, where A and C are both lotteries corresponding to a pricing mechanism. In the case of A, the first dimension corresponds to the buyer's valuation $v_i$ for item A and the second dimension is time. In the case of C, the two dimensions are for buyer valuations $v_1$ and $v_2$ for two different items, A and B (in the illustration, A is a computer and B is a scanner, although any number of items and any type(s) of item are contemplated). The price p shown at 60 for a lottery token (or, more generally, a transaction contract) is set for each item/group of items offered. The probability $z_i$ being awarded a given item is also displayed at 62. In the case of option C, two probabilities are shown, one for item A and one for item B. The holder of such a token could thus be the recipient of the item A, B, or nothing (in some lotteries, the buyer may also have a probability of receiving both A and B). A time window 64 for the offer may also be shown. In one embodiment, the price 60 is a fixed price output by the pricing mechanism. In some embodiments, it is an average price—once the buyer has decided which lottery option he is interested in, clicking on an icon 66 or other actuable area of the screen directs the buyer to another screen, where insured prices are determined and presented, as described in co-pending application Ser. No. 12/792,254, entitled LIMITED LOTTERY INSURANCE. In this specific embodiment, the process may vary depending on the buyer's valuations to counteract risk aversion.

At least one of the lottery options is non-deterministic, i.e., is provided with probability equal to neither 0 nor to 1. This is the case for all three options in FIG. 4, since each probability is greater than 0 and less than the maximum of 1. Other options in the lottery may be deterministic, i.e., they are provided with probability 0 or 1. For example, the menu may list an option A' as for A but with a price of $510 and a probability of 1, an option for B', as for B, but with a price of $199 and a probability of 1, and/or an option for C', as for C, but with a price of $675 and a probability of 1.

Each non-deterministic lottery option (A, B and C in the example) is associated with a region of a value space, which may be analogous to that shown in FIG. 1. Each axis of the value space corresponds to a specific item, thus, for n items the value space is n-dimensional. The position along the respective axis indicates the maximum that a buyer would pay for that item, relative to any outside option(s).

A lottery option involving at least one non-deterministic item may be associated with a time window 64, which is the set of times over which any of the items in the lottery is considered as useful. For instance, when selling a one-month subscription starting today, the time window would be one month starting today.

The lottery menu 10 may contain a discrete set of lottery options (as shown in FIG. 4), a continuum of lottery options, or some combination thereof. A continuum of lottery options is a variable lottery. It corresponds to any relationship from a dense set of prices to outcome probabilities for which the outcome probabilities are not piecewise constant. For example, the seller may establish an average price p for a probability $z_i = f(p)$ where function $f$ is continuous and not a constant.

Further details of the method and system will now be described.

In order to apply pricing mechanism design, the seller needs an appropriate belief about the distribution of buyer valuations. The problem solved by the present disclosure is to experiment with multiple mechanisms in order to trade-off the exploration and exploitation of the seller's knowledge of the distribution of buyer valuations.

In application Ser. No. 12/792,028, entitled LEARNING OPTIMAL PRICES, it is shown how lotteries can benefit the learning process. While lotteries may be used in the exemplary learning process, more general exploration-exploitation methods, including non-sequential exploration, for pricing mechanism are also contemplated. Non-sequential exploration may have the benefit of limiting the impact of (poorly-understood) "price-stickiness" effects.

Establishing the Seller's Initial Belief (S102)

The seller's initial belief of the buyers' valuations is a probability distribution over a possible range of values for each of the n items being offered. The initial belief may be based on prices buyers have previously paid for similar items. Various ways for establishing the initial belief are contemplated. For example, this belief over valuation distributions is suitably the same as might be chosen for a set of censored price experiments (CPE's). In this approach, the seller estimates the distribution of buyers' valuations from censored observations.

More generally, the belief over valuation distributions may be chosen on the basis of diverse factors. For example, because the pricing process is performed concurrently with actual selling of the products, the initial valuation estimates may be high enough that the seller has some sales revenue (that is, not selling at a loss), but should not be so high that the price results in few or no sales. In general, the valuation distribution alone does not determine the price. The seller cost also determines the pricing mechanism offered (prices and probabilities). Since one objective is generally to provide profit for the seller then no reasonable mechanism would offer below-cost consideration or allocations, since then the seller would lose money. Moreover, the approaches disclosed herein are not limited to the application of seller profit maximization, but rather can also be applied for optimizing respective to other goals, such as maximizing buyer welfare (e.g. the sum of buyers' valuations) or optimizing loading on product suppliers or internal supply lines. The optimization can be respective to a combination of objectives: by way of illustrative example, an optimization that maximizes a sum (or other balancing) of buyer welfare (i.e., surplus) and seller profit. Such an optimization balancing seller profit and buyer welfare is suitable, for example, in the case of healthcare products. Given that human valuation distributions may be complex, due to the range of outside options, budget constraints and a heterogeneous population of buyers, it is advantageous for the belief over the valuation distribution to be flexible in terms of what valuation distributions it can represent.

In some embodiments, the valuations are discretized. For example, in the case of n=2 items, the seller may discretize the space of buyer values into a grid of, for example, 7×7 elements each indexed by a range of values in $v_1$ and $v_2$, and assign probabilities to buyers' falling in each of the elements of the grid (FIG. 1). These values may be received by the exemplary computer system 8 for performing the method, and stored in memory 32. As will be appreciated, the system may initialize the beliefs using information, such as sales data, generated by the seller, rather than have the seller assign probabilities.

For ease of computation, the buyer values for each of the n items may be normalized, e.g., to values in the range of 0-1. Solving Pricing Mechanism Design Problems (S104, S112)

In this step, a set of pricing mechanisms are proposed, by the system 8, based on the seller's current (initial or subsequently updated) belief of the buyers' valuations of the items being offered. In one embodiment, the solution to the multiple mechanism design problem is cached in order to make the method operate faster. In particular, a set of pricing mechanisms output by step S104 may be stored in memory 32.

Various ways of repeatably and efficiently computing solutions to pricing mechanism design problems are contemplated. By way of example, two formulations are described: the direct approach, in terms of prices and lottery probabilities; and the indirect approach, which is in terms of a so-called mechanism function. The direct approach is more intuitive, while the latter approach is more concise and scales to problems with a continuum of valuations.

1. Direct Approach

For purposes of simplification, the direct approach can be formalized as follows: Consider a discrete set of buyer types, indexed by b, who occur with probability $f_b$, who receive lottery probabilities $z_b$, for price $p_b$, when they are honest about their valuation $v_b$.

The lottery probabilities $z_b$ for each item can be expressed as a multidimensional vector, each component of the multidimensional vector giving the probability that a buyer of that type receives the item corresponding to that component. For example, where the probabilities of two items are 0.01 and 0.05, the vector is represented by (0.01, 0.05). The buyer type's valuations for each item (normalized to a scale of 0-1) may also be represented as a multidimensional real vector. E.g., when the buyer's valuation for items 1 and 2 are $900 and $200, the maximum valuations for these items are $1000 and $400, the valuations vector can be (0.9, 0.5).

The seller wishes to maximize some welfare which may be partly influenced by the buyers' valuations of the items. This can be expressed as a weighted combination of the seller's expected revenue $\Sigma_b f_b p_b$, minus the seller's expected cost $\Sigma_b f_b z_b \cdot c$, where c is the vector of costs, plus α times the expected buyer's surplus $\Sigma_b f_b (v_b \cdot z_b - p_b)$, where α is a weight:

$$\text{Seller's Welfare} = \Sigma \text{hd } b f_b^p{}_b - \Sigma_b f_b z_b \cdot c + \alpha \Sigma_b f_b (v_b \cdot z_b - p_b)$$

If α is 0, the welfare reduces to the seller's profit, i.e., the seller is not influenced by the extent to which the buyer's value exceeds the price paid.

The direct approach may take into account that buyers may not be truthful about their valuations. Specifically, a buyer's utility w for pretending that his valuation is really that of another buyer type b' whose value vector is $v_{b'}$, can be expressed as a function of the probability vector $z_{b'}$ for the buyer of type b', the value vector $v_b$, and the price $p_{b'}$ paid by buyers of type b':

$$w(v_b, v_{b'}) := z_{b'} \cdot v_b - p_{b'}.$$

The mechanism may thus be required to satisfy the following constraints:
1. Incentive compatibility $w(v_b, v_{b'}) \leq w(v_b, v_b)$ for each pair of buyers b, b'; a buyer therefore has no incentive not to be truthful (the maximizing of the expression can be subject to a constraint that provides an incentive for buyers to provide true valuations).
2. Individual rationality $w(v_b, v_b) \geq 0$ for each buyer b; and
3. That lottery probabilities are indeed probabilities, so that $z_b \in [0,1]^n$ where n is the number of items involved in the mechanism.

The solution can then be expressed as a linear program in variables $z_b$, $p_b$. Explicitly:

$$\max_{z,p} \sum_b f_b (p_b - z_b \cdot c + \alpha(v_b \cdot z_b - p_b))$$

which may be subject to one or more constraints:
$z_b \cdot v_b - p_b \geq 0$ for each buyer b;
$z_b \cdot v_b - p_b - z_{b'} \cdot v_b + p_{b'} \geq 0$ for each pair of buyers b, b' (or for a subset of pairs of buyers, as outlined below); and
$z_b \in [0,1]^n$ for each buyer b.

The output of this step is thus the values of variables $z_b$, $p_b$ which maximize this expression. These values are then used as the basis of a pricing mechanism, such as a menu of lotteries shown in FIG. 4. The mechanism offered is then the menu of all unique pairs $\{(z_b, p_b)\}$. Each such unique pair constitutes an individual lottery option.

The seller may also wish to apply mechanisms where the buyer only values acquiring at most one of the items. This results in an equivalent problem with an extra constraint that $1 \cdot z_b \in [0,1]$ where 1 is the n-vector with all components equal to one.

The exemplary linear program has a number of incentive compatibility constraints that are quadratic in the number of buyer types. Many of these constraints are active in practice. Where there are up to a maximum of about 100 buyer types, problems of this form may be readily solved when directly passing the full linear program to an automated solving application such as (lp_solve).

However, approximations can be made which extend the applicability to larger numbers of buyer types. For example, given regular rectangular grids of valuations, by applying incentive-compatibility constraints to only a subset of the buyer types (closest neighbors), e.g., the nearest neighbors in the valuation space as well as the nearest neighbors of those nearest neighbors, e.g., the 24-neighbors of each buyer in the case of two dimensions, the linear program has been shown to obtain mechanisms that are globally incentive compatible and can solve problems with $10^4$ distinct valuations. The 24-neighbors of a point with integer coordinates (x, y) corresponding to the buyers' valuations of two items, are the points:

$$\{(a,b): |a-x| \in \{0,1,2\}, |b-x| \in \{0,1,2\}, (a,b) \neq (x,y)\}.$$

where a is the valuation of a first item and b is the valuation of a second item. The incentive compatibility constraints can, of course, be checked, given a trial solution. The extension of this technique also works in higher dimensions.

However, when applying this technique to non-uniformly-spaced grids, incentive compatibility may not always be preserved. One approach to overcome this is to repeatedly resolve the linear program including a subset of the violated constraints at each stage.

2. Indirect Approach

This approach takes the problem form the buyer's point of view and tries to maximize the buyer's surplus. In this approach, given a continuum of buyer valuations, the problem may be posed as a semi-definite program (SDP). A SDP is a linear program with some additional constraints that certain matrices have non-negative eigenvalues.

The SDP is posed in terms of the utility or surplus $u(v):=w(v,v)$ of a buyer with valuation v. In this context, the utility is known as the mechanism function. Remarkably, the SDP formulation of the problem has only a linear number of constraints.

To derive the SDP, the buyer's utility when they do not give a true valuation but lie that their valuation is v' is expressed as:

$$w(v,v'):=z(v') \cdot v - p(v').$$

To first order, the incentive compatibility constraint then says that telling the truth should be a stationary point of this function $$\frac{\partial}{\partial v'_i} w(v, v') = 0 \Rightarrow \frac{\partial}{\partial v_i} u(v) = \left[\frac{\partial}{\partial v'_i} w(v, v') + \frac{\partial}{\partial v_i} w(v, v')\right]_{v'=v} = z_i(v).$$

This expression for the lottery probability also gives an expression for the price:

$$p(v) = \sum_i \left(v_i \frac{\partial}{\partial v_i} u(v)\right) - u(v)$$

and for the liar's utility $$w(v, v') := \left\{\sum_i \left(v_i \frac{\partial}{\partial v'_i} u(v') - v'_i \frac{\partial}{\partial v'_i} u(v')\right)\right\} - u(v').$$

To second-order, the incentive compatibility constraint says that the liar's utility is concave:

$$\left[\frac{\partial^2}{\partial v'_j \partial v'_k} w(v, v')\right]_{v'=v} \preccurlyeq 0.$$

Here $\preccurlyeq$ is the convex (or cone) inequality and says that all eigenvalues of the matrix on the left-hand side should be non-positive. Using the expression for the liar's utility just derived, this is equivalent to:

$$\left[\frac{\partial^2}{\partial v_j \partial v_k} u(v)\right] \succcurlyeq 0.$$

In other words, the mechanism function should be convex.

In summary, the corresponding SDP for profit-maximization (the case of other forms of welfare is obtained analogously) is then:

$$\max_{u: \mathbb{R}^{n+} \to \mathbb{R}} \int f(v)(v \cdot \nabla u(v) - u(v)) dv^n$$

subject to the constraints:

$$u(v) \geq 0,$$

$$\left[\frac{\partial^2}{\partial v_j \partial v_k} u(v)\right] \succcurlyeq 0, \text{ and}$$

$$\nabla u(v) \in [0, 1]^n$$

each constraint being for all valuations $v \in \mathbb{R}^n$.

Given that this problem is over a continuum, a suitable set of basis functions can be chosen to construct an approximate solution. In low-dimensions, this can be achieved by discretizing the range of valuations and applying conventional finite element methods for taking partial derivatives. A number of public-domain SDP solvers exist (e.g., CSDP). Effective basis functions and mesh refinement techniques for solving pricing mechanism design SDPs are discussed by Aguilera and Morin, "On convex functions and the finite element method." Preprint arXiv:0804.1780 (2008).

Solving the Experimental Design (S106)

One aspect of this step is to balance exploration and exploitation by purposely identifying pricing mechanisms from those identified at S104 which are risky in their outcomes. This step may identify values for lottery probabilities and prices for buyers in regions of the grid (or other discretized regions in n-dimensional space, where n>1) in order to identify the mechanism(s) which is/are optimal under the current belief (the myopic mechanism) as well as mechanisms which are more risky, under the current belief, and thus more able to test the current belief. For example, if the seller has always sold a brand of TV and DVD player together for $600, the myopic mechanism may be that he offers the TV and DVD player combination for about $300 with a 0.5 probability of the buyer being awarded the TV and a 0.5 probability of the buyer being awarded the DVD player. A more risky mechanism would, for example, be one in which the TV and DVD player combination was offered at a much higher price with the same probabilities. While the seller risks the possibility that there will not be many sales in such a lottery, he will gain more information on the probability distribution over the buyers' values.

In a sequential approach, step S106 may result in the identification of a single pricing mechanism to be tried next. In a non-sequential approach, step S104 results in a set of weights, where pricing mechanism $\mathcal{M}$ obtains weight $w_\mathcal{M}$ and $\Sigma_\mathcal{M} w_\mathcal{M} = 1$. The pricing mechanisms may thus be distributed to buyers in proportion to these weights, so that roughly a fraction $w_\mathcal{M}$ of buyers receive mechanism $\mathcal{M}$. The distribution can be accomplished via a combination of different approaches. For example, it is possible to provide different prices for one-dimensional (or price-only multidimensional) mechanisms in different places, at different times, in different languages or via different brands owned by the same company.

Two methods of experimental design are proposed. One approach is sequential and closely related to the method described in application Ser. No. 12/792,028, entitled LEARNING OPTIMAL PRICES.

1. Sequential Approach

The exemplary sequential approach is as follows:

a. Assume a set of pricing mechanisms indexed by $\mathcal{M}$.

b. Assume that the seller's belief of buyer valuations is drawn from a multinomial distribution over a set $V := \{v_1, v_2, \ldots, v_N\}$. The assumption of a known finite set of valuations can in some cases be motivated by a discretization of the space of monetary units. The multinomial has parameter vector $\theta = \{\theta_1, \ldots, \theta_N\}$ with $\Sigma_{i=1}^N \theta_i = 1$. Each buyer type in the distribution is presumed to have valuation $v_k$ with parameter vector $\theta_k$ corresponding to valuation probabilities for each of the items.

While the set of possible valuations V is known, the probabilities θ of observing particular values are not known perfectly to the seller. Belief hyper-parameters β can be defined over parameters θ of the valuation distribution. These hyper-parameters correspond to a probability distribution. For example, a Dirichlet distribution is taken as the assumed density (i.e., a representation of the seller's belief about the parameters of the multinomial) in the illustrative examples. The Dirichlet distribution is sufficiently general to allow any specific valuation probabilities θ and is thus known as a non-parametric prior. Choosing such a distribution makes much sense as real-world valuation distributions are known to be rather complex, involving sharp transitions from budget constraints and competing outside options.

At time step t=0 the seller's Dirichlet belief is given by parameters $\beta = \{\beta_1, \ldots, \beta_N\}$ with $\beta_i > 0$. The corresponding probability density function over possible valuation distributions is:

$$\mathbb{P}(\theta) := Dir(\theta; \beta) = \frac{\Gamma(\beta_1 + \ldots + \beta_N)}{\Gamma(\beta_1) \ldots \Gamma(\beta_N)} \theta_1^{\beta_1 - 1} \ldots \theta_N^{\beta_N - 1}$$

The Dirichlet distribution is conjugate to the multinomial. Therefore computing posteriors $\mathbb{P}(\theta | v_i)$ after fully-observing a buyer's value $v_i$ is easy. The result is another Dirichlet with parameters $\beta' := \beta + e_i$ where $e_i$ is a shorthand for a vector of length N with a 1 at position i and zeros everywhere else. That is:

$$\mathbb{P}(\theta | v_i) = \frac{\Gamma(\beta_1 + \ldots + \beta_N + 1)}{\Gamma(\beta_1) \ldots \Gamma(\beta_i + 1) \ldots \Gamma(\beta_N)} \theta_1^{\beta_1 - 1} \ldots \theta_i^{\beta_i} \ldots \theta_N^{\beta_N - 1}.$$

The sequential approach may proceed as follows:

1. Find a myopic optimal mechanism $\mathcal{M}^*$ for the current belief (FIG. 5, S106A). The myopic mechanism is the optimal mechanism assuming the current belief to be true. Finding the myopic mechanism may include:

(i) Finding the posterior valuation distribution $f(v|\beta)$.

(ii) Walking through the cached list of mechanisms obtained at S104 and computing the profit:

$$\sum_v f(v|\beta) p_\mathcal{M}(v)$$

i.e., the seller's welfare (here, the profit) is expressed as a sum over valuations v of the probability of that valuation times the price $p_\mathcal{M}(v)$ paid by a buyer with that valuation in mechanism $\mathcal{M}$. Alternatively, the price may be replaced by a price minus average cost (the average being over lottery probabilities), or some other welfare. Alternatively, the sum may be replaced by an integral or approximate integral, given a continuum of valuations.

(iii) Selecting a pricing mechanism with largest profit or welfare as the myopic mechanism.

2. Sample K parameter vectors $\theta_1, \ldots, \theta_K$ from the current belief about the buyers' valuation distribution, where K is an integer e.g., at least 2 or at least 3 and up to about 100, e.g., K=5. (FIG. 5, S106B). The sampling may be performed by sampling from the Dirichlet of the belief. Any sampling method can be used. See, for example, http://en.wikipedia.org/wiki/Dirichlet_distribution.

3. For each sample $\theta_k$, solve for an optimal mechanism $\mathcal{M}_k$ (S106C). This provides the optimal price/profit under this mechanism, for the given sample.

4. Evaluate the profits $\pi_k$ for this optimal mechanism and profits $\pi^*_k$ for the myopic-optimal mechanism on this sample (S106D), e.g., find the difference between the two.

5. Select an exploratory mechanism with index to be any mechanism $\mathcal{M}_k$ satisfying $\pi_k - \pi^*_k \geq \pi_j - \pi^*_j$ for all $j \neq k$ (S106E). This has the effect of choosing an exploratory mechanism with the following property: If the parameter vector $\theta_k$ corresponding to this exploratory mechanism were the true parameter vector of the buyer's valuation distribution (which is usually reasonably probable as $\theta_k$ is one of only a few samples from the posterior), then the seller is at a high risk from using the current myopic mechanism. In some embodiments, the mechanism providing the largest profit difference is selected at S106E, thereby maximizing the risk, although other mechanisms may be selected based on other constraints.

2. Alternative Approach (UCB)

In this approach, at S106, an Upper Confidence Bound (UCB) scheme may be used. This may be based on the methods described by Lai, Agrawal, Auer and Cesa-Bianchi (see, e.g., T.-L. Lai, Adaptive treatment allocation and the multi-armed bandit problem, The Annals of Statistics, 1987; R. Agrawal, Sample mean based index policies with O (log n) regret for the multi-armed bandit problem, Advances in Applied Probability, 1995; and P. Auer, N. Cesa-Bianchi, P. Fischer, Finite-time analysis of the multiarmed bandit problem, Machine Learning, 2002). This scheme is a general method for the multi-armed bandit problem and does not use an explicit model of buyer valuations. It associates each cached mechanism $\mathcal{M}$ with a count $n_\mathcal{M}$ of how many times that mechanism has been tried and the mean price $\mu_\mathcal{M}$ paid when that mechanism has been tried in the past. In the current setting, the mean price is initialized to the expected price under the posterior distribution. In step t, the mechanism $\mathcal{M}$ with the largest value for:

$$\mu_\mathcal{M} + C\sqrt{\log t / n_\mathcal{M}}$$

is tried. The parameter C can be selected to be, for example, 0.3 in experiments involving a valuation range $[0,1]^2$.

This method does not rely on region-censored updating and, in general, is slower to approach an optimal solution than the sequential approach described above.

Generation of a Menu of Lotteries (S108A)

In one embodiment, the methods described above output the next mechanism to be tried sequentially, such as the mechanism with the largest profit difference at S106E. In other approaches, several mechanisms may be tried.

In such not-purely-sequential settings, each mechanism may be associated with a weight, where mechanism $\mathcal{M}$ obtains weight $w_\mathcal{M}$ and $\Sigma_\mathcal{M} w_\mathcal{M} = 1$. The pricing mechanisms may be distributed to buyers in proportion to these weights, so that roughly a fraction $w_\mathcal{M}$ of buyers receive mechanism $\mathcal{M}$. The weights are selected to maximize a linear combination of the myopic expected profit and an exploratory term. If the parameters to be estimated are $\theta$, the exploratory term can be formulated in terms of a covariance matrix. This covariance corresponds to the covariance obtained when linearly expanding the estimate of $\theta$ after some number T of rounds about a chosen point. This method is described by, for example, Chaloner, K., Verdinelli, I., Bayesian Experimental Design: A Review. *Statistical Science*, (3):273-304 (1995). There are several ways of turning this matrix into a scalar that may be optimized. As examples, the following methods may be used:

1. A-Optimal: minimize the trace of the covariance matrix.
2. D-Optimal: minimize the determinant of the covariance matrix.
3. E-Optimal: minimize the maximum eigenvalue of the covariance matrix.
4. G-Optimal: minimize maximum prediction variance over some set of future control settings.
5. V-Optimal: minimize average prediction variance over some set of future control settings.
6. Maximin: as in the A-, D-, E-, G-, or V-Optimal designs, but maximizes the criterion over Taylor expansion points.
7. Robust E-Optimal: minimize the maximum over bounded perturbations of the maximum eigenvalue of a perturbed covariance matrix.
8. Sequential-Bayesian: does one of the D-, A-, E-, G-, or V-optimal designs, then updates beliefs and repeats.

Recording Buyers' Selections (S108)

At S108A, the mechanism or mechanisms output from S106 may be presented to actual buyers as a menu of lotteries, e.g., displayed on a screen as shown for example, in FIG. 5, or by other suitable means. The buyers are free to choose from the lottery menu and can decide not to accept any of the offers corresponding to the pricing mechanism being evaluated. The offers accepted and payments made are recorded (S108B). For example, the proportion of buyers which accept the lottery giving probabilities of receiving each of a plurality of items for a determined or determinable price or who accept the offer of a fixed price for one or both of two or more items is recorded. From this information, a seller's current belief about the buyers' distribution of values can be generated (S110). In the exemplary embodiment, this is achieved through region-censored updating.

Region-Censored Updating of Seller's Belief about Buyers' Valuation Distribution (S110)

In one embodiment, region-censored updating is used for updating the seller's belief. In particular, values of one or more of the hyper-parameters $\beta$ are updated, based on the observations at S108. A region-censored update is performed where at some stage in the update of the seller's belief about the buyers' valuations, a region in the value space (in the case of two or more items) or type space (in the case of a single item) is identified which is not simply a point or line segment (i.e., it is multi-dimensional) and this region is used as the basis for the hyper-parameter (or parameter) updates. This region may directly correspond to an observation of a buyer's decision and the set of alternative decisions that were available. This means that each observation corresponds to a value coming from a multidimensional set in real Euclidean n-space for n>1.

It can be assumed that the prior (sellers' current belief) is Dirichlet on a multidimensional grid. If this is the case, assumed density filtering (ADF) updates can be applied directly as described in application Ser. No. 12/792,028, entitled LEARNING OPTIMAL PRICES. For example, the censoring set is restricted to the set of buyer valuations that would prefer the same lottery as that selected by the current buyer.

Region-censored updating for a continuous distribution of buyer valuations can be performed in various ways. By way of example, three methods for making region-censored updates are contemplated: (1) assumed density filtering (ADF), (2) expectation propagation (EP), and (3) Gibbs sampling (GS).

Given a random variable x (such as buyer valuation) where $x \in \mathbb{R}^n$ with a probability distribution with parameters $\theta \in \mathbb{R}^m$ over which there is a belief $g(\theta|\beta)$ with hyper-parameters $\beta \in \mathbb{R}^l$. In each case, the object is update a current belief given an observation $x \in R$ that the random variable x is seen to come from some region R. By Bayes's rule the "correct" new belief is:

$$g_B(\theta|\beta, R) = \frac{g(\theta|\beta)\int_R dx^n f(x|\theta)}{\int d\theta^m g(\theta|\beta)\int_R dx^n f(x|\theta)}.$$

In the case that $g(\theta|\beta)$ is from an exponential family of densities, $g_B$ can be approximated by another density $g(y|\hat{\beta})$ which is from the same exponential family of densities but with updated hyper-parameters $\hat{\beta}$. A distribution is considered to be from an exponential family of densities when it can be written in the form:

$$g(\theta|\beta) = \exp(\Phi(\theta) \cdot \beta)/B(\beta)$$

for some function $\Phi: \mathbb{R}^m \to \mathbb{R}^l$ and a normalizing function $B: \mathbb{R}^l \to \mathbb{R}$ which is known as the partition function. The functions $\Phi$ define the natural moments h of a distribution g via:

$$h(z) := \mathbb{E}_{y \sim g(y|z)}[\Phi(y)].$$

One way to make the approximation is to match the natural moments of the approximate belief $g(y|\hat{z})$ with the natural moments of the Bayesian belief $g_B$. This approach is ADF. It corresponds to solving the following (usually non-linear) equations for updated hyper-parameters $\hat{\beta}$: B:

$$h(\hat{\beta}) = \mathbb{E}_{y \sim g_B(\theta|\beta, R)}[\phi(\theta)] = \frac{\int d\theta \phi(\theta) g(\theta|\beta) \int_R dx^n f(x|\theta)}{\int d\theta^m g(\theta|\beta) \int_R dx^n f(x|\theta)\}}.$$

Typically, the solution of the non-linear equations (substantially corresponding to computing the inverse of the natural moment function $h^{-1}$) can be readily accomplished via Newton's method. The integrals on the right-hand side can cause more computational effort. For instance, given a multivariate normal density or a multivariate t-density for $f(x|\theta)$, the integral $\int_R dx^n f(x|\theta)$ over a convex region R, can be computed using a special-purpose algorithm. See, for instance, A. Genz, F. Bretz, "Comparison of methods for the computation of multivariate-t probabilities," Journal of Computational and Graphical Statistics, 2002.

Rather than directly representing a functional form for the Bayesian belief following region-censored observations, an alternative is a Gibbs sampling approach to sample from this posterior distribution. The exploration-exploitation method described above can be reformulated to only rely on samples from the posterior. The key change is to remove the step of comparing profits $\pi_k$ from mechanisms for sampled parameters $\theta_k$ with the myopic mechanism, and simply to pick an exploratory mechanism k that maximizes the profit, so that $\pi_k \geq \pi_j$ for all j. For further details on Gibbs sampling, see Bulla, P., Muliere, P., Walker, S., Bayesian Nonparametric Estimation of a Bivariate Survival Function, Statistica Sinica, 17, 427-444 (2007).

Methods for updating using expectation propagation (EP) are described, for example, in Minka, T., Expectation Propagation for Approximate Bayesian Inference. *Proc. 17th Annual Conf. Uncertainty in Artificial Intelligence* (2001); and Minka, T., A family of algorithms for approximate Bayesian inference. PhD Thesis, MIT (2001).

The method illustrated in FIGS. 2 and 5 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 5, can be used to implement the method for learning pricing mechanisms.

Examples of Pricing Mechanisms

The following are examples of pricing mechanism designs, which can be learned as pricing mechanism design problems with the exemplary method.

1. "Cartel" or "Supermarket": This is the case of an intermediary (for instance, a web-service intermediary) that sells products or services from multiple vendors. If the intermediary conducts simultaneous price experimentation across products from multiple vendors, it is possible that in lowering the price of one product, the intermediary gives incentive to buyers to stop purchasing another near-substitute product. There is thus a lack of coordination in price experimentation when it is conducted on an item-by-item basis. Furthermore, when using price-only mechanisms, sellers do not maximize profit or attempt to learn about valuations of a second product when selling a first product. The exemplary method may be applied advantageously to correct these limitations. A set of vendors could pass control of experimental pricing to the intermediary who then would conduct simultaneous price experimentation across all their products.

Censored updating, described in greater detail below, handles the case when a product A is initially sold by itself and then a transition to pricing mechanisms is made involving, for example, products B, C and D. The initial-phase sales of product A correspond to observations that are fully-censored over all possible valuations for products B, C, and D.

2. Sequential Pricing: Another vendor strategy that could be learned by the present is sequential pricing. Sequential pricing has been described as "When sellers can condition the second good's price on the buyer's decision to purchase the first good, sequential pricing can also increase profits relative to mixed bundling when customer's values for the goods are highly positively correlated." Aloysius, J., Deck, C., Farmer, A., Leveraging Revealed Preference Information by Sequentially Pricing Multiple Products (2009), available at http://comp.uark.edu/~cdeck/Leveraging%20Revealed%20Preference%20Infor mation%20by%20Sequentially%20Pricing%20Multiple%20Products.pdf. In the exemplary embodiment, when a buyer has indicated a sufficiently high valuation for some item or set of items, a menu of lotteries corresponding to those items plus some additional items with positively dependent valuations may be recommended and the system learns from the buyer's response.

3. Time Control: a seller may propose time constraints on the availability of a single item, thereby making it act multi-dimensionally. This includes practices that discriminate on the basis of buyers' temporal discount factor, perform advance selling or provide access to a service only at some random subset of future times.

There are multiple ways to sell a single item as if it were multidimensional and thus fit with the method described herein. One approach is by proposing time constraints on the item's availability. Three options are given as examples:

a) It is understood that buyers differ in their extent of temporal discounting and hyperbolicity (see, Laibson, D., Golden eggs and hyperbolic discounting. Quarterly Journal of Economics, 112(2):443-77 (1997)). Thus, their valuation for a product to be paid now differs from their valuation for the same product to be paid at a different time. The coupling of these valuations with different temporal discount and hyperbolicity defines a three-dimensional valuation space, over which valuations can be learned.

b) Advance selling is a practice where profit is increased by threatening to charge a much higher price for a product at a later time, unless the buyer purchases now (see Xie, J., Shugan, S., Advance Selling Theory, in Handbook Of Pricing Research In Marketing (Vithala R. Rao, Ed. (2007)). This practice is increasingly common and profitable (in fact it can be shown that for some valuation distributions it is possible to make arbitrarily more profit in this way than by a take-it-or-leave it price). To apply the exemplary method to this setting, consider the buyer as having two valuations, one for immediate consumption of the service and another, which is the expected valuation of consumption in some future time interval.

c) Another option is to provide access to a service only at some random subset of future times. Buyers could be confronted with a choice between having access to their account service 50% of the time, or 100% of the time. This can also be used as an interpretation of the lotteries in pricing mechanism design. If a buyer is ambivalent about having access to music A or music B, they may choose to have random access to A or B on different days.

4. Education Discount: this is a method for selectively encouraging workers to perform better in training and tests than they otherwise would have. This may be implemented through a reduction in commission paid by buyers of online work. The reduction might be a function of the attainment of a performance target in a test and of the amount of training time required to reach this target.

The exemplary learning method is thus not only applicable to selling, but also to learning subsidies. Managers and governments may choose to exploit, invest in, or develop their employees and citizens. It can be presumed that the latter option tends to lead to greater happiness, motivation, loyalty, and profit in the long term. Indeed, there is considerable evidence that increased educational investment leads to GDP growth. However, there is also considerable variability in this effect and controversy surrounding how best to achieve it.

The outsourcing of labor is undergoing enormous changes through modern web technologies. There has been a dramatic increase in homeshoring by telecommuters who perform jobs remotely for buyers, enabled by outsourcing portals, such as oDesk® (see www.odesk.com) and Elance™ (see www.elance.com). These changes entail challenges in developing corresponding new approaches to evaluating work quality, recruitment, coordination, motivation and contracting.

From an economic perspective, such portals are markets on which sellers (workers), offer the use of their skills to buyers, who offer money in exchange for certain work. The amount of money is conditioned on the workers' skills, as signaled by results in online tests, and by other attributes, such as past experience. If such a market could incentivize workers to obtain better results than they would normally bother to obtain, on the right tests, then it could benefit the workers by providing them with higher profit, and also tend to dominate other markets due to the desirability of its workforce to buyers. This could be achieved by setting an appropriate subsidy for test performance. Today such markets generate their own revenue by extracting a commission which is a proportion of the revenue from each job. Such a subsidy could be paid in the form of reduced commission, contingent on the test target being achieved.

To set the subsidy, the multidimensional private valuation of the worker for learning a new skill(-set) to a prescribed level, within a time limit, as measured by a test, is considered. This private valuation may include the opportunity cost of spending time learning rather than working; a fatigue or enjoyment of learning; a cost from doing a test; an expected profit from increased revenue due to the new skill minus costs from exploiting that skill in doing a new type of job. This valuation is essentially multidimensional since it depends on which test, which time limit and which prescribed performance level are applied. The analog to "cost" in the selling problem, in this case, is "additional profit" due to having a worker with a higher test performance than they would be expected to attain in the absence of a subsidy, thereby signaling better quality. In this setting, the additional profit would be predicted based on all aspects of the worker's current profile. The pricing mechanism learning approach described herein can thus be applied to this setting.

Without intending to limit the scope of the exemplary embodiment, the following examples demonstrate applications of the exemplary system and method.

Example 1

A Comparison of Different Methods

A grid of buyer valuations for two items was constructed (a 7×7 grid). Each of the 49 regions of the grid of possible buyer values was assigned normalized discrete buyer valuations for two items, as illustrated in FIG. 1. For this example, a set of actual buyer valuations (unknown to the system) was established to test how quickly the exemplary methods reached a mechanism appropriate for this set of valuations. Three methods were compared:

1 CPE lot: This used the sequential method at S106, and censored price experiments with region-censored updates (assumed density filtering (ADF) updates). Only mechanisms which were optimal (106E) were used in the experimental design stage (S108).

2. CPE det: This used the sequential method at S106, and censored price experiments with region-censored updates (assumed density filtering (ADF) updates). However, instead of conducting lotteries at S108, S112, was limited only to mechanisms that do not involve lotteries (price-only mechanisms).

3. UCB—This used a UCB method adapted to the multidimensional case without region-censored updates. Parameter C was selected to be 0.3 in the experiments conducted with the UCB scheme.

4. For comparison, the best possible mechanism that could be used if the valuation distribution was known in advance is shown.

Figure 6:
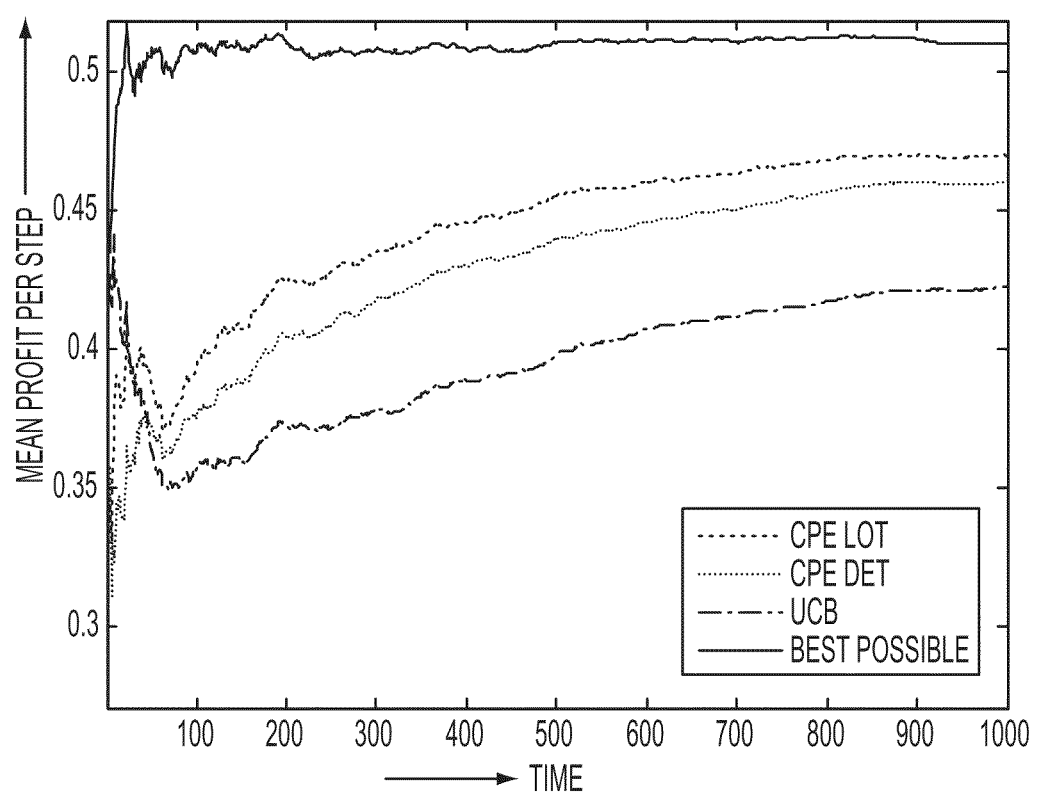
FIG. 6 is a graph showing results of learning experiments as the average over 10 runs of a 2-dimensional price experiment.

FIG. 6 shows the mean profit for a 2-dimensional price experiment, per stage, obtained for a 7×7 grid of valuations on $[0,1]^2$ for each of the three approaches. This was an average over 10 runs each of length 1000 steps.

Each approach was confronted with the same sequence of buyer valuations in each run. The beliefs were initialized to the same prior as that which was used to sample the parameters of the valuation distribution. This prior was a Dirichlet with all parameters equal and summing to 3.

As may be expected, over time, all approaches tend to converge to the best possible result. The convergence in this example is quite slow, since the assumed prior was very general, there are many possible mechanisms and only censored updates are available. It was observed that when the best mechanism is a price-only mechanism, the CPE using only deterministic lotteries converged faster than the full CPE. On the other hand, restricting to price-only mechanisms gives a final-stage loss of up to 50% in some samples. The UCB approach converged more slowly, which is not surprising as it exploits no structural information about the valuation distribution. Nevertheless, the best possible mechanism was that which UCB tried most often in 6 out of 10 samples. One would expect learning to be rather faster given a more restrictive class of beliefs,

Example 2

Educational Discounts

To demonstrate the applicability to educational discounts, the following exemplary embodiment illustrates four things.

A. That the proposed multidimensional price learning method based on region-censored belief updates is not only applicable to selling, but also to learning subsidies.

B. That it is applicable not only to buyer types that are valuations, but also to buyer types that are of a more general nature.

C. That the mechanism design problems involved need not be linear programs, semi-definite programs but may also be of a more general nature.

D. The variables in the mechanism design problems need not be lottery probabilities, but may be of a more general nature.

Managers and governments may choose to exploit, invest in, or develop their employees and citizens. Presumably the latter option tends to lead to greater happiness, motivation, loyalty and profit in the long term. Indeed, there is considerable evidence that increased educational investment leads to GDP growth. However, there is also considerable variability in this effect and controversy surrounding how to best achieve it.

The outsourcing of labor is undergoing enormous changes through modern web technologies. There has been a dramatic increase in homeshoring by telecommuters who perform jobs remotely for buyers, enabled by outsourcing portals like Odesk® and Elance™. These changes entail challenges in developing corresponding new approaches to evaluating work quality, recruitment, coordination, motivation and contracting. From an economic perspective, such portals are platforms on which workers offer the use of their skills to buyers, who offer money in exchange for certain work. The amount of money is conditioned on the workers' skills, as signaled by results in online tests, and by other attributes, such as past experience. If such a market could incentivize workers to obtain better results than they would normally bother to obtain, on the right tests, then it could benefit the workers by providing them with higher profit, and also tend to dominate other markets thanks to the desirability of its workforce to buyers. This could be achieved by setting an appropriate subsidy for test performance. Today such markets generate their own revenue by extracting a commission which is a proportion of the revenue from each job. In the exemplary embodiment, the subsidy may be paid in the form of reduced commission, contingent on the test target being achieved.

To set the average price of the subsidy, the multidimensional private valuation of the worker for learning new skills to a prescribed level, within time limits, is considered as measured by a test. This private valuation might include the opportunity cost of spending time learning rather than working; a fatigue or enjoyment of learning; a cost from doing a test; an expected profit from increased revenue due to the new skill minus costs from exploiting that skill in doing a new type of job. This valuation is essentially multidimensional since it depends on which test, which time limit and which prescribed performance level.

For the portal, the analog of cost in the selling problem, in this case is "additional profit" due to having a worker with a higher test performance than they would be expected to attain in the absence of a subsidy, thereby signaling better quality. Given well-designed tests, an improvement in the signaled quality is likely to also correspond to improved quality of work, since the learner has improved their capability in a subject beyond what it would have been in the absence of a subsidy. In this setting, the additional profit could be predicted based on all aspects of the worker's current profile. On the other hand, subsidies in this formulation can be considered as negative "prices" in the selling formulation.

To apply multidimensional price learning based on region censored updates to this setting, assume that a worker's type consists of two parameters (x, a). The real number x, is the expected target, which represents the worker's expected performance on a particular test in the absence of additional motivation from a subsidy. It is likely that some workers have made more effort on a particular subject than others in the past and therefore can expect to do better or may have a natural predisposition to succeed in this area.

The positive real number a, is the learning effort. This reflects how much effort the worker must make to achieve an improved test score. In particular, it is assumed that a worker expects it will cost her an extra amount $a(\max\{0, y-x\})^2 := a(y-x)^{+2}$ to achieve a target score of y. In this example, a quadratic function is chosen on the basis that all sufficiently smooth functions resemble quadratic functions near their maxima. However other functions of these variables are also contemplated for exceeding the expected target. The choice of zero extra cost for not meeting the expected target can be motivated by the fact that it is very easy to deliberately choose some wrong answers to a test, or to simply not complete some answers.

In this application, the multidimensional mechanisms are a menu $\{(p_k, y_k)\}$, whose elements are indexed by k, of subsidy amount $p_k$ for achieving a corresponding target $y_k$. Given such a mechanism, the worker's problem is to select a target. A perfectly rational worker would select the target that maximizes their utility u(x, a) relative to the outside option of doing the test without any subsidy:

$$u(x, a) := \max\left\{0, \max_k p_k - a(y_k - x)^{+2}\right\}.$$

As before, the maxima over the menu we can consider as functions p(x, a) and y(x, a).

In reality, some workers may be incentivized by subsidies to take tests that they otherwise would not take. Additionally, they will be highly uncertain about their likely performance as a function of the amount of effort that they exert in learning. Finally, they will often want to consider multiple possible tests, between which the mechanism could provide lotteries. These phenomena may be captured by increasing the dimension of the problem: while this increases the dimension and thus the computational cost of solving the problem, it does not substantially change the nature of the solution method. Therefore these aspects are not described here.

MECHANISM DESIGN: The system's problem is to select the menu of prices and targets $\{(p_k, y_k)\}$ to maximize the profit. If the targets $y_k$ are sorted in increasing order, this results in a target-price curve. We assume that the system or other component of the web-based portal has estimated a quantity $\delta$ describing how much additional discounted profit $\delta\Delta x$ they will make on average from an improvement by $\Delta x$ of a worker's score on the particular test in question at that particular time. The system's problem is then to maximize the expected profit from the additional score minus the amount paid in subsidy:

$$J[y(\cdot), p(\cdot)] := \mathbb{E}_{x,a}[\delta(y(x,a)-x)-p(x,a)].$$

For a given probability density function $f(x, a)$ over types (x, a) this problem is linear in the variables y(x, a), p(x, a) in the objective. However, the incentive compatibility constraints are quadratic in the targets, and, in general, it these constraints are not convex. Therefore the following local search approach can be employed for approximately optimizing the mechanism (i.e., the target-price curve):
1. Select a discretization of the set of target scores, $y_k \in \{y_1, y_2, \ldots, y_n\}$ and a discretization of the set of subsidies $p_k \in \{p_1, p_2, \ldots, p_m\}$. In one embodiment, $p_1=0$ and $y_n=100\%$ (the maximum test score).
2. Select an initial guess for the target-price curve (i.e., the menu of prices and targets when sorted by target) $(p_j, y_j)$ (for instance $p_j=0$ for all j).
3. Repeat the following some number of times (e.g. 1000):
   a. Select a target $y_i$, $i \in 1, 2, \ldots, n$ for which to change the subsidy price $p_i$ (e.g. by sampling uniformly from the discrete set of targets).
   b. Select the best possible price $p_i = p_j$ for that target from the discrete set of prices $p_j$, $j \in 1, 2, \ldots, m$ in terms of the objective $J[y(\cdot), p(\cdot)]$ representing expected profit from test improvement minus subsidy. When evaluating these prices one ensures that the target-price curve remains monotonically non-decreasing.
   c. If the best possible price improves the objective $J[y(\cdot), p(\cdot)]$ relative to the current objective, update the current belief for the target-price curve to one which achieved this maximum.
4. Return the current belief for the target-price curve.

Figure 7:
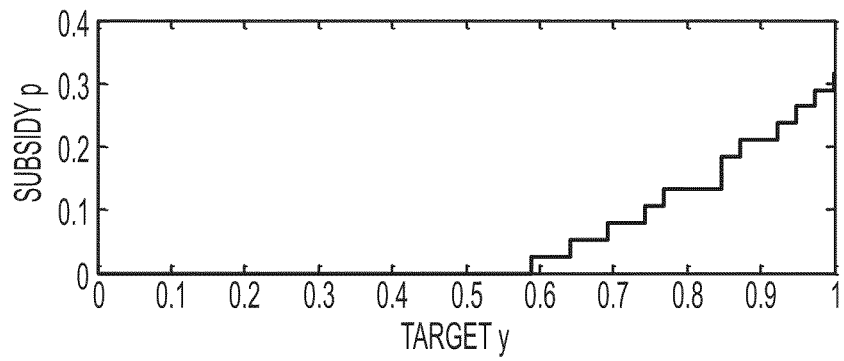
FIG. 7 is a plot illustrating an example of an optimized target-price curve for an educational subsidy case.
Figure 8:
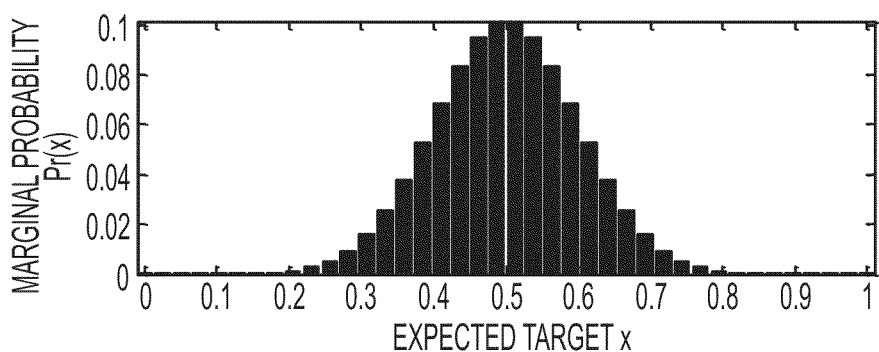
FIG. 8 is a plot illustrating the initial marginal distribution of an expected target x for the educational subsidy case of FIG. 7.
Figure 9:
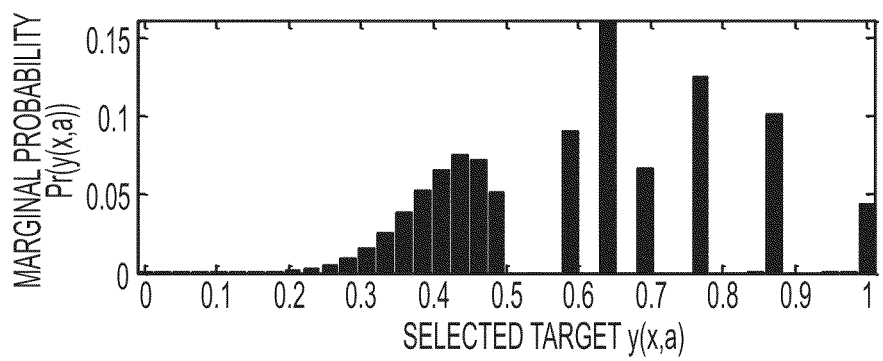
FIG. 9 illustrates the resulting distribution of a selected target, given the target-price curve of FIG. 8.

To illustrate the application of procedure, an example optimized target-price curve for a distribution of types which is normal in expected target x and uniform in the learning effort a is shown in FIG. 7. FIG. 8 shows an example of an initial marginal distribution of expected target x. The resulting distribution of selected target y(x, a), given the target-price curve is shown in FIG. 9. FIGS. 8 and 9 illustrate how the subsidies improve the distribution of test performance.

Figure 10:
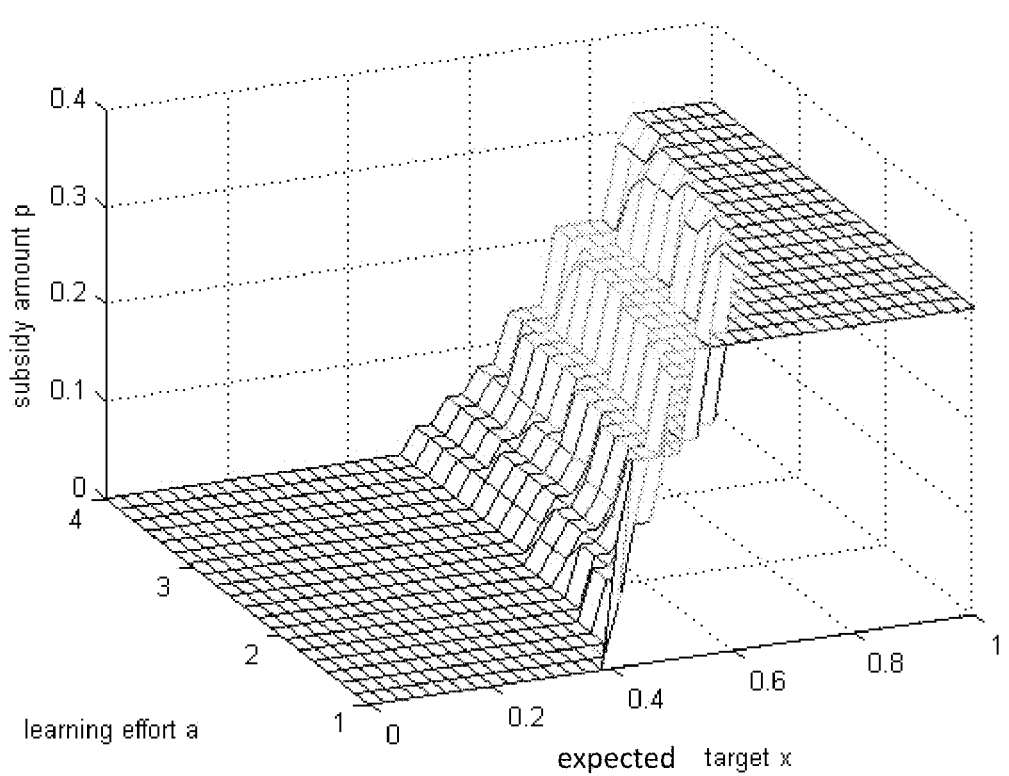
FIG. 10 is a plot illustrating selected subsidy as a function of type of participant in the example of FIGS. 7-9.

FIG. 10 illustrates the selection behavior of the workers via their choice of subsidy amount. For a given learning effort a, participants with a higher expected target x select higher targets and thus higher subsidies. However, given reduced learning effort, this effect occurs for lower expected targets and the increase in subsidy as a function of expected target is more rapid.

LEARNING: Typically, the portal will be unaware of the exact joint distribution $\mathbb{P}(x, a)$ but rather have some belief $g(\theta)$ over the parameter vector $\theta$ of some family $f(x, a|\theta)$ of such joint distributions. In this formulation, the observation that a worker prefers a subsidy $\rho_k$ and target $y_k$ corresponds to an observation that the worker's type lies in the set:

$$R_k := \{(x,a): p_k - a(y_k-x)^{+2} \geq p_j - a(y_j-x)^{+2} \forall \in 1,2,\ldots,n\}.$$

Such sets correspond to flat regions in FIG. 10.

A first aspect of learning corresponds to updating the beliefs $g(\theta) \to g(\theta|k)$ in response to an observation that the type lies in region $R_k$. Ideally this update follows Bayes' rule:

$$g_{Bayes}(\theta|k) = \frac{g(\theta) \int_{R_k} dx\, da\, f(x, a|\theta)}{\int d\theta \{g(\theta) \int_{R_k} dx\, da\, f(x, a|\theta)\}}.$$

Unfortunately, this expression may be intractable when iterated for multiple region-censored observations. Therefore it is easier to solve nonlinear equations to match moments of the approximating posterior distribution $g(\theta|k)$ to those of.

$g_{Bayes}(\theta|k)$

The second aspect of learning is to trade off exploration of parameter vector $\theta$ with exploitation of existing knowledge of this parameter. As above, this may be achieved by sampling from the approximate posterior $y(\theta|k)$ and selecting a mechanism (in this case $\{(y_j, p_j)\}$) which performs best over samples of $\theta$ relative to the performance of the myopic mechanism on the sample. In this approach, each sub-problem may be solved using the mechanism design method outlined above for this specific problem.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A method comprising:
   storing in memory a current estimate about the multidimensional distribution of buyers' valuations for at least one item, wherein in the current estimate, a valuation space of possible buyer valuations for each of at least two items is discretized into regions, each region corresponding to a buyer valuation for each of the items and wherein the current estimate is an expression of the probability distribution over the buyer valuation regions;
   based on the current estimate, proposing at least one pricing mechanism to buyers, each pricing mechanism establishing a price for the at least one item, wherein each buyer comprises an entity being offered and potentially accepting the pricing mechanism;
   storing observed buyers' responses to at least one of the set of proposed pricing mechanisms, the observed responses comprising, for each of a plurality of buyers, whether the buyer agrees to accept the proposed pricing mechanism;
   conducting region censored updates to the estimate about the multidimensional distribution of buyers' valuations based on the observed responses to generate a new estimate about the multidimensional distribution of buyers' valuations, the region censored updating comprising identifying a multi-dimensional region within the multidimensional space of buyer valuations which is used as the basis for updating the estimate about the multidimensional distribution of buyers' valuations; and
   based on the new estimate, proposing a pricing mechanism establishing a price for the at least one item; and
   wherein at least one of the proposing at least one pricing mechanism, the storing observed buyers' responses and the conducting region censored updates is performed by a computer processor executing a program stored in non-transitory memory.

2. The method of claim 1, wherein the pricing mechanism based on the new estimate is expected to improve a seller's welfare under the new estimate, relative to the pricing mechanisms proposed based on the current estimate.

3. The method of claim 1, wherein each of the at least one pricing mechanism establishes a price for a lottery comprising at least two items, each of the at least two items being associated with a respective non-definite probability that a buyer will receive the item.

4. The method of claim 3, wherein the observing buyers' responses comprises observing, for each of a plurality of buyers, whether the buyer agrees to pay the price for the lottery.

5. The method of claim 1, wherein the proposing of the at least one pricing mechanism includes selecting a pricing mechanism which maximizes an expression of the seller's welfare based on the current estimate about the multidimensional distribution of buyers' valuations.

6. The method of claim 5, wherein the maximizing the expression is subject to a constraint that provides an incentive for buyers to provide true valuations.

7. The method of claim 1, wherein the at least one pricing mechanism comprises a plurality of pricing mechanisms and the method further comprises associating each of the plurality of pricing mechanisms with a weight and distributing the pricing mechanisms to buyers in proportion to the weight.

8. The method of claim 1, wherein the region censored updating comprises updating parameters of a probability distribution function over probabilities of buyer valuations in the current estimate, wherein the probability distribution function is a Dirichlet distribution.

9. The method of claim 1, further comprising caching a set of pricing mechanisms based on the current estimate and wherein the proposed at least one pricing mechanism is drawn from the cached pricing mechanisms.

10. The method of claim 1, wherein the at least one item comprises a plurality of items and wherein a first dimension of the current estimate concerns buyers' valuations for a first of the plurality of items and a second dimension of the current estimate concerns buyers' valuations for a second of the plurality of items.

11. The method of claim 1, wherein the at least one item comprises a single item and wherein a first of the dimensions comprises buyer valuation for the single item and a second dimension is a time dimension.

12. The method of claim 1, further comprising, repeating a plurality of times the proposing of the at least one pricing mechanism based on the current estimate, the storing observed buyers' responses to at least one of the set of proposed pricing mechanisms, the conducting region censored updates, and the proposing of the pricing mechanism establishing a price for the at least one item based on the new estimate, wherein for each repeat, the prior new estimate becomes the current estimate.

13. A method, comprising:
storing in memory a current estimate about the multidimensional distribution of buyers' valuations for at least one item;
based on the current estimate, proposing at least one pricing mechanism to buyers, each pricing mechanism establishing a price for the at least one item, wherein each buyer comprises an entity being offered and potentially accepting the pricing mechanism;
storing observed buyers' responses to the at least one of the set of proposed pricing mechanisms, the observed responses comprising, for each of a plurality of buyers, whether the buyer agrees to accept the proposed pricing mechanism;
conducting region censored updates to the estimate about the multidimensional distribution of buyers' valuations based on the observed responses to generate a new estimate about the multidimensional distribution of buyers' valuations, the region censored updating comprising identifying a multi-dimensional region within the multidimensional space of buyer valuations which is used as the basis for updating the estimate about the multidimensional distribution of buyers' valuations and wherein the region-censored updating comprises assumed density filtering (ADF); and
based on the new estimate, proposing a pricing mechanism establishing a price for the at least one item; and
wherein at least one of the proposing at least one pricing mechanism, the storing observed buyers' responses and the conducting region censored updates is performed by a computer processor executing a program stored in non-transitory memory.

14. A method comprising:
storing in memory a current estimate about the multidimensional distribution of buyers' valuations for at least one item;
caching a set of pricing mechanisms based on the current estimate; proposing a set of pricing mechanisms to buyers, each pricing mechanism establishing a price for the at least one item, the pricing mechanisms being drawn from the cached pricing mechanisms, comprising:
from the cached set of pricing mechanisms, identifying an optimal pricing mechanism which provides the largest profit to the seller over a valuation distribution under the current estimate,
sampling the multidimensional distribution of buyers' valuations for the current estimate,
based on the sample, identifying, from the cached pricing mechanisms, a pricing mechanism with a largest profit difference when compared to the optimal pricing mechanism; and
proposing, as one of the set of pricing mechanisms, the pricing mechanism with the largest profit difference;
obtaining and storing observed buyers' responses to at least one of the set of proposed pricing mechanisms;
conducting updates to the estimate about the multidimensional distribution of buyers' valuations based on the observed responses to generate a new estimate about the multidimensional distribution of buyers' valuations; and
based on the new estimate, proposing a pricing mechanism establishing a price for the at least one item; and
wherein at least one of the proposing at least one pricing mechanism, the storing observed buyers' responses and the conducting updates is performed by a computer processor executing a program stored in non-transitory memory.

15. A computer program product comprising non-transitory media storing instructions which, when executed by a computer, perform the method of claim 1.

16. A system comprising:
non-transitory memory which stores instructions for:
storing in memory a current estimate about the multidimensional distribution of buyers' valuations for at least one item, wherein in the current estimate, a valuation space of possible buyer valuations for each of at least two items is discretized into regions, each region corresponding to a buyer valuation for each of the items and wherein the current estimate is an expression of the probability distribution over the buyer valuation regions;
based on the current estimate, proposing at least one pricing mechanism to buyers, each of the at least one pricing mechanisms establishing a price for the at least one item, wherein each buyer comprises an entity being offered and potentially accepting one of the proposed pricing mechanisms;
storing observed buyers' responses to at least one of the set of proposed pricing mechanisms;
conducting region censored updates to the estimate about the multidimensional distribution of buyers' valuations based on the observed responses to generate a new estimate about the multidimensional distribution of buyers' valuations, the region censored updates comprising identifying a multi-dimensional region within the multidimensional space of buyer valuations which is used as the basis for updating the estimate about the multidimensional distribution of buyers' valuations; and based on the new estimate, proposing a pricing mechanism establishing a price for the at least one item; and a processor in communication with the memory for executing the instructions.

17. The system of claim 16, further comprising a display for displaying the pricing mechanism as a menu of lotteries and a user interface for receiving a buyer's selection from the displayed menu which is stored by the system.

18. A method for establishing a pricing mechanism:
a) storing in memory a current estimate about the multidimensional distribution of buyers' valuations for a plurality of items;
b) based on the current estimate, proposing a first pricing mechanism, the pricing mechanism establishing a price and for each of the items, a non-deterministic probability of receiving the item for the price;
c) offering the pricing mechanism to a plurality of buyers;
d) storing the buyers' responses to the offered pricing mechanism; e) with a computer processor, updating the current estimate about the multidimensional distribution of buyers' valuations based on the responses to generate a new estimate about the multidimensional distribution of buyers' valuations;
f) based on the new estimate, proposing a second pricing mechanism establishing a price for the plurality of items; and
g) repeating a)-f) at least once, wherein in each repeat, in a), the current estimate is the new estimate most recently established in f).

* * * * *